July 26, 1949.  W. W. PAGET  2,477,525
AIR CONDITIONING SYSTEM
Filed Aug. 31, 1943  11 Sheets-Sheet 1
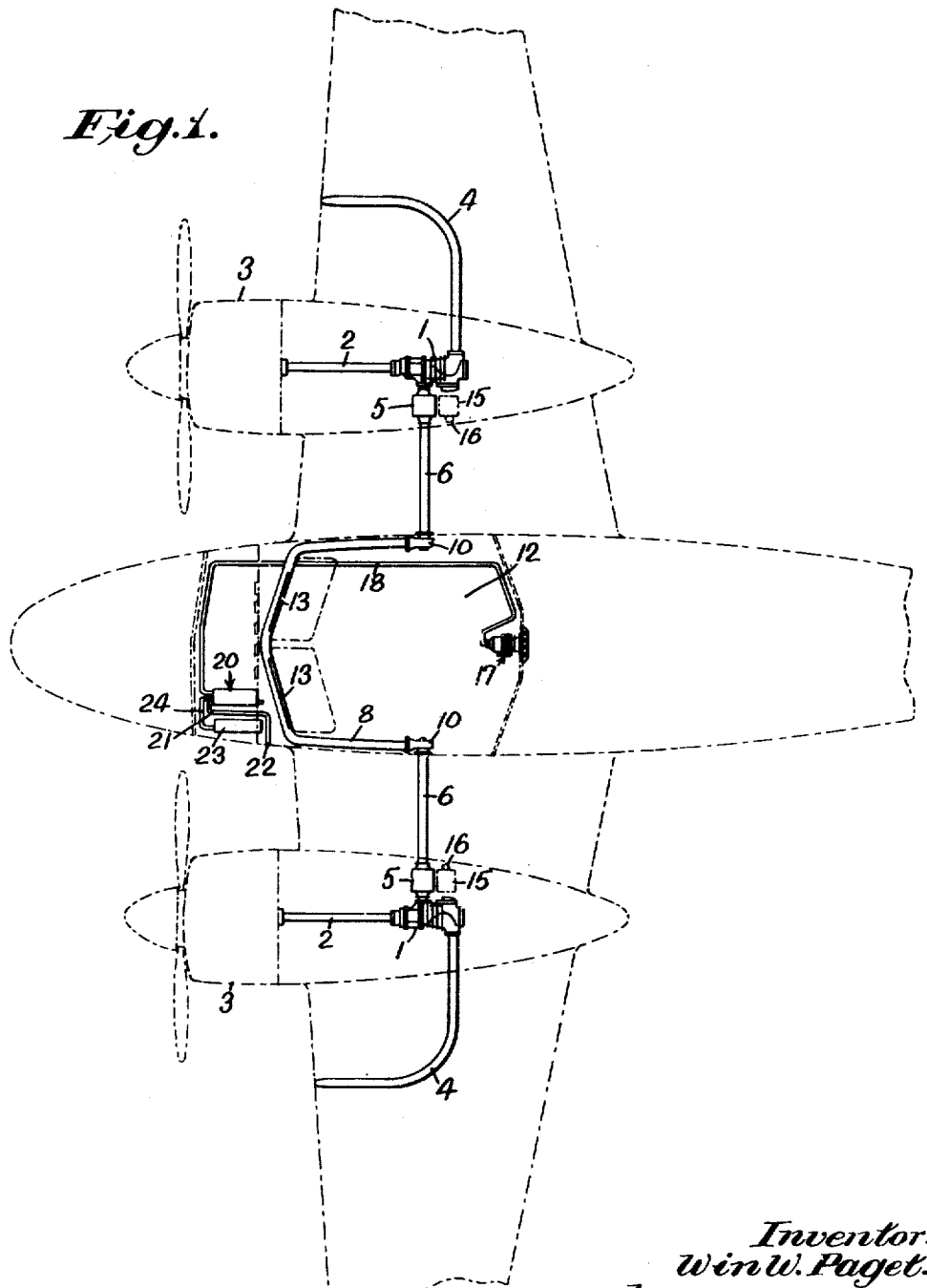
Inventor:
Win W. Paget.
by Louis A. Maxson,
Atty.

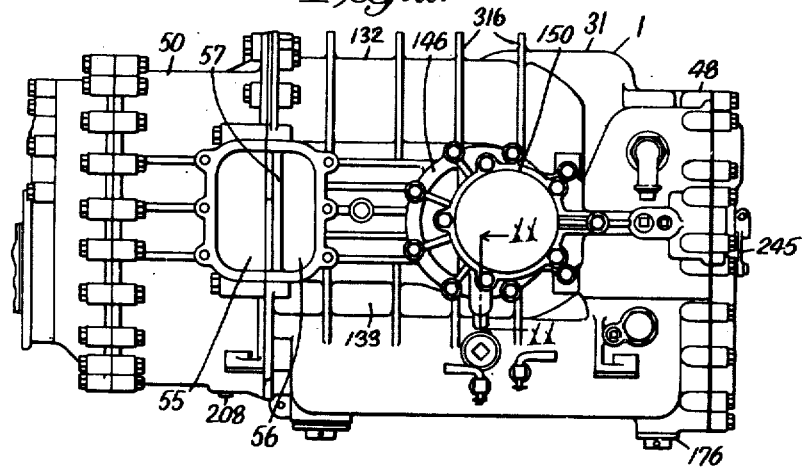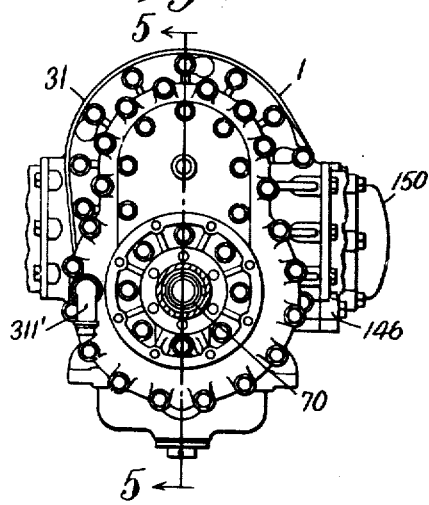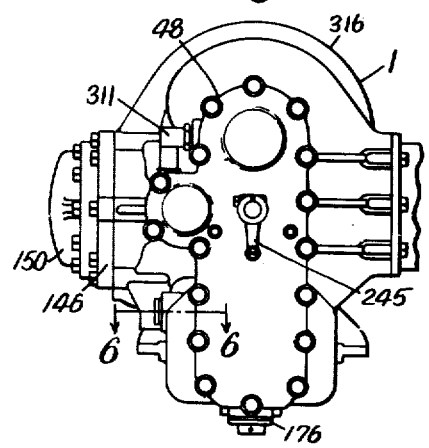

July 26, 1949.
W. W. PAGET
2,477,525
AIR CONDITIONING SYSTEM
Filed Aug. 31, 1943
11 Sheets-Sheet 3
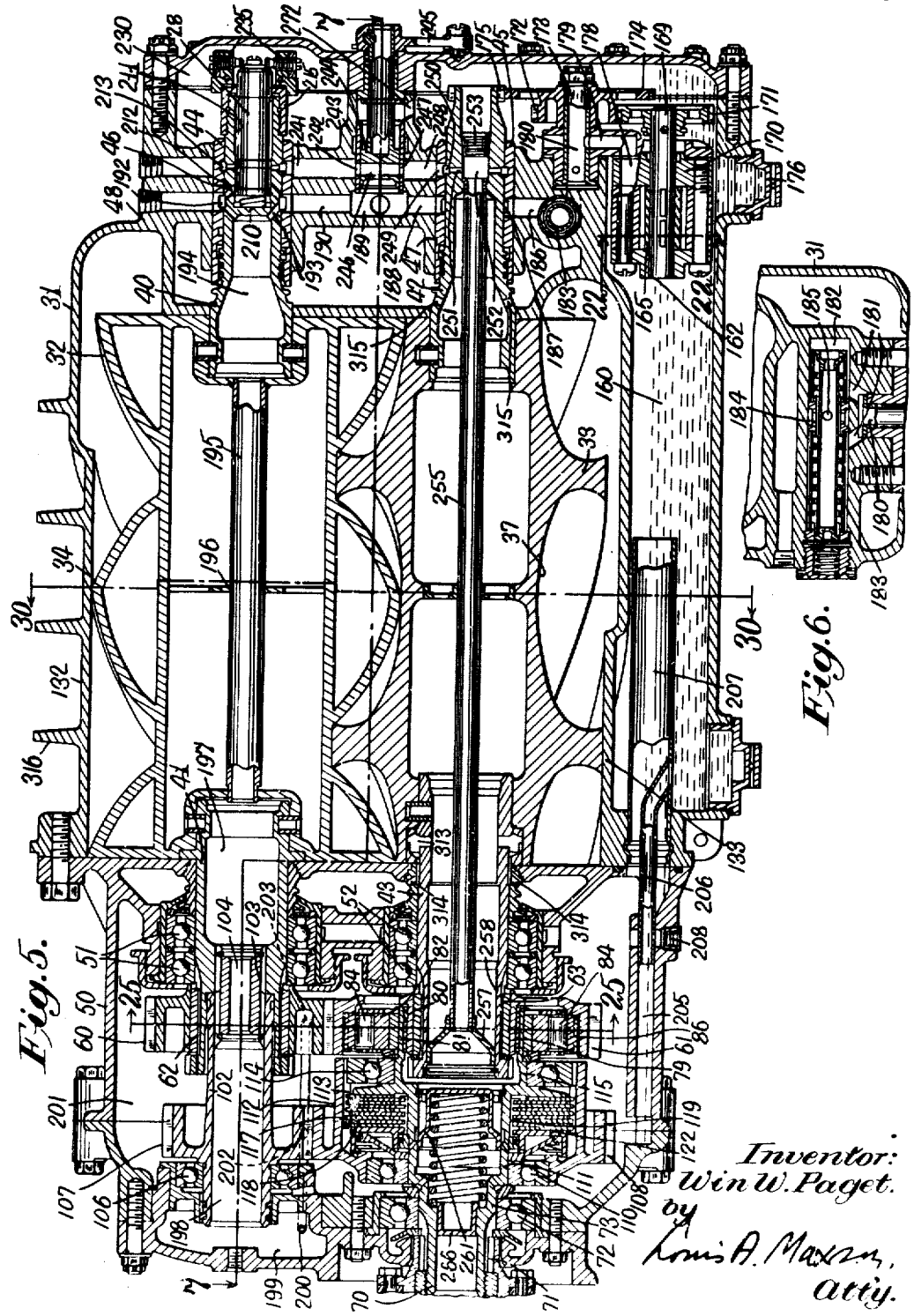
Inventor:
Win W. Paget.
by
Louis A. Maxson,
atty.

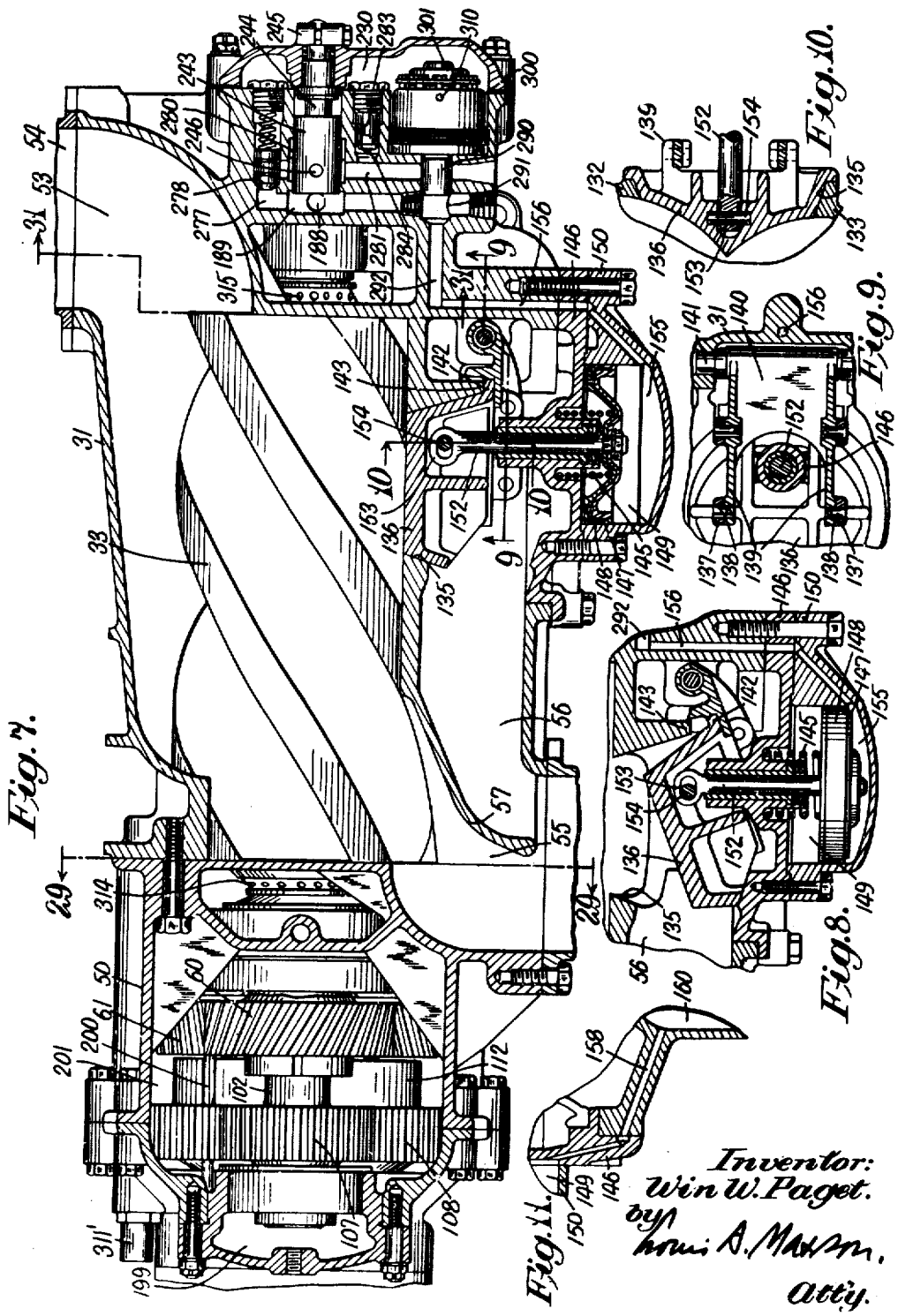

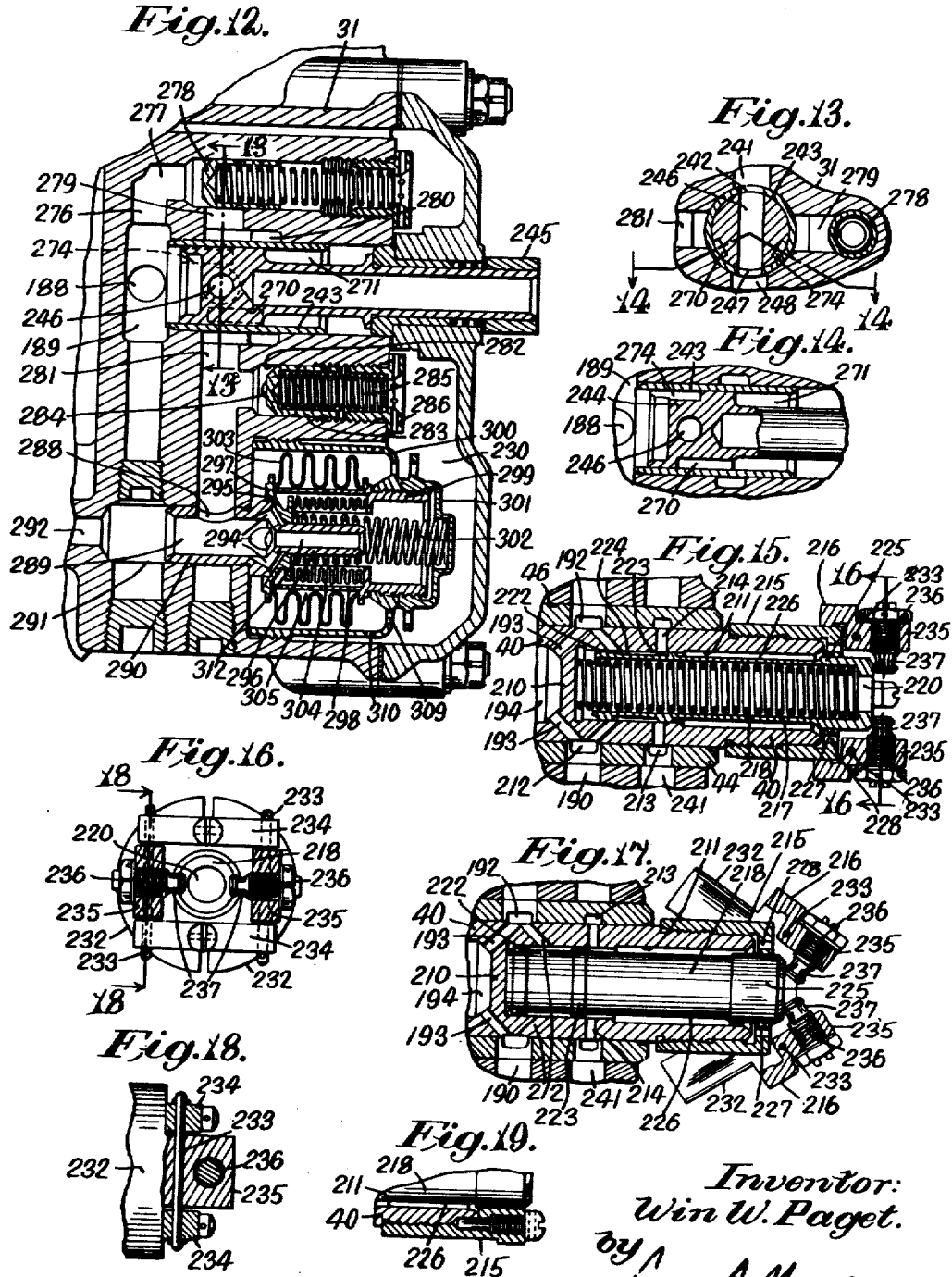

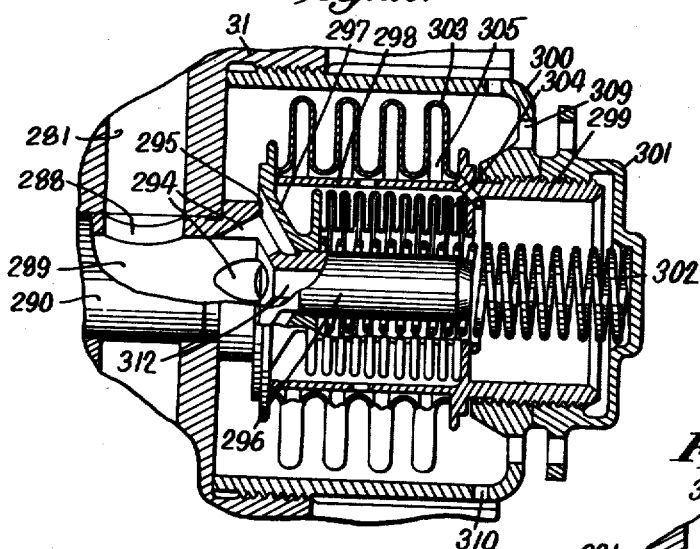
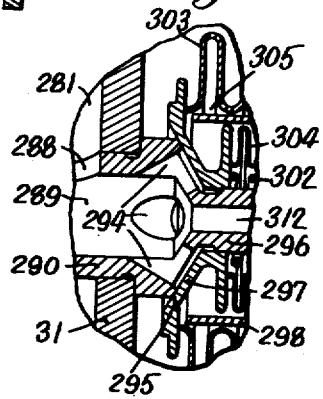
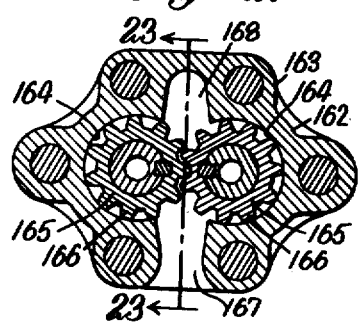
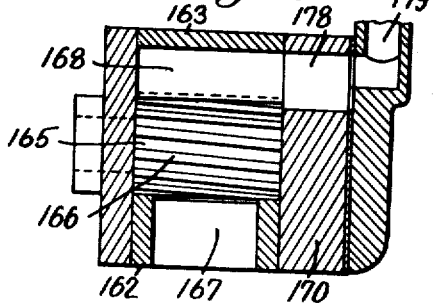

July 26, 1949.  W. W. PAGET  2,477,525
AIR CONDITIONING SYSTEM
Filed Aug. 31, 1943    11 Sheets-Sheet 7
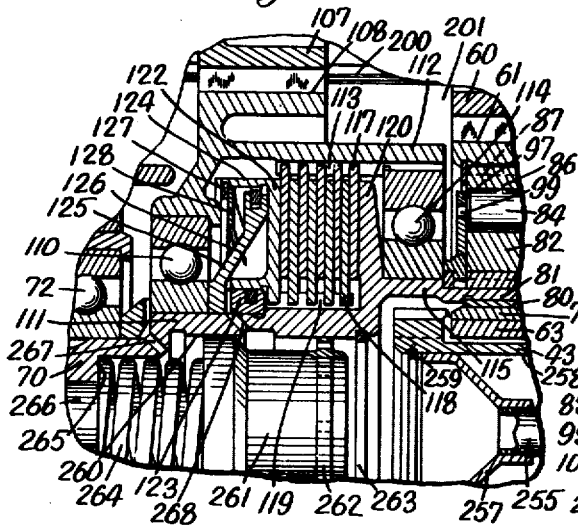
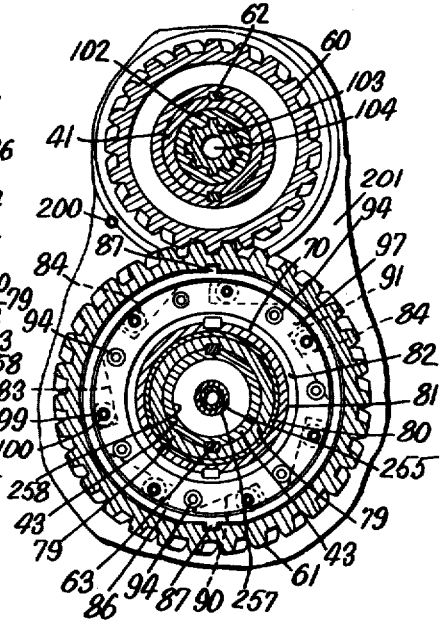
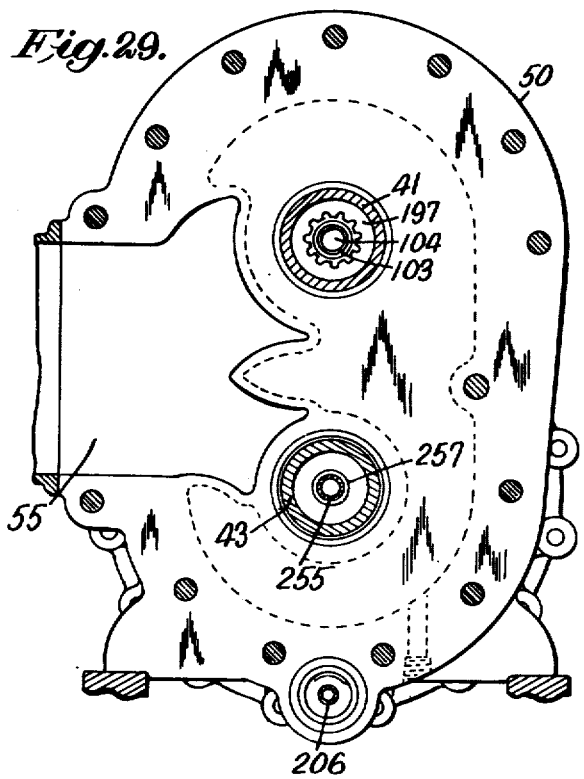
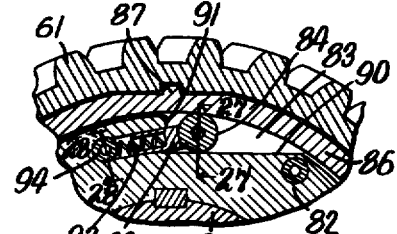
Inventor:
Win W. Paget.
by Louis A. Maxson,
atty.

July 26, 1949.    W. W. PAGET    2,477,525
AIR CONDITIONING SYSTEM
Filed Aug. 31, 1943    11 Sheets-Sheet 8
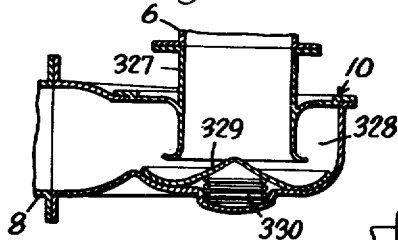
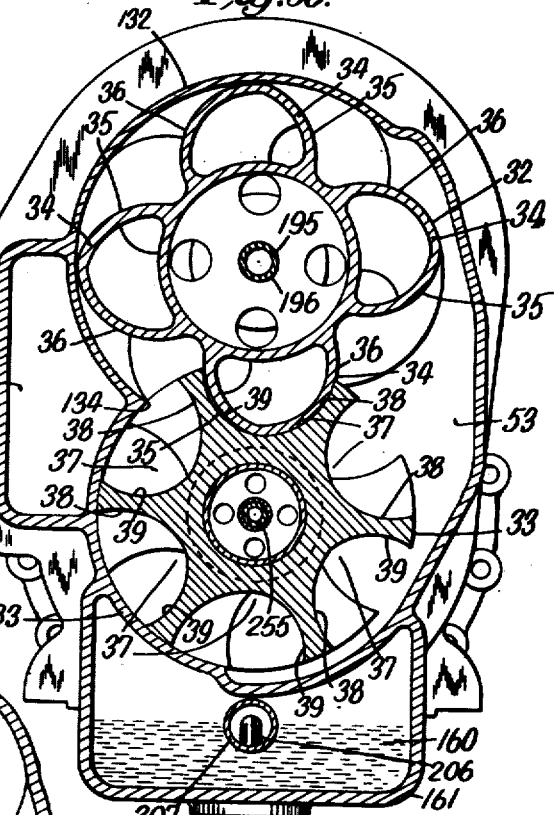
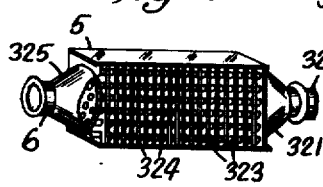
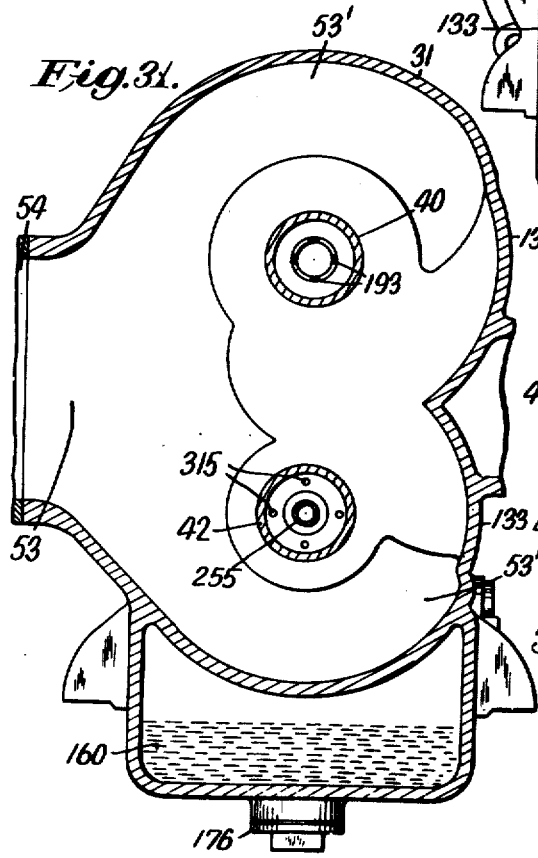
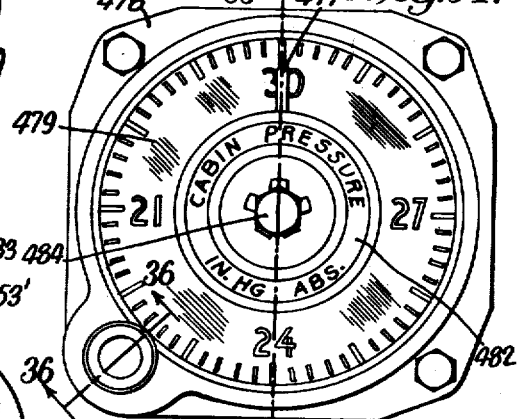
Inventor:
Win W. Paget.
by Louis A. Maxon,
Atty.

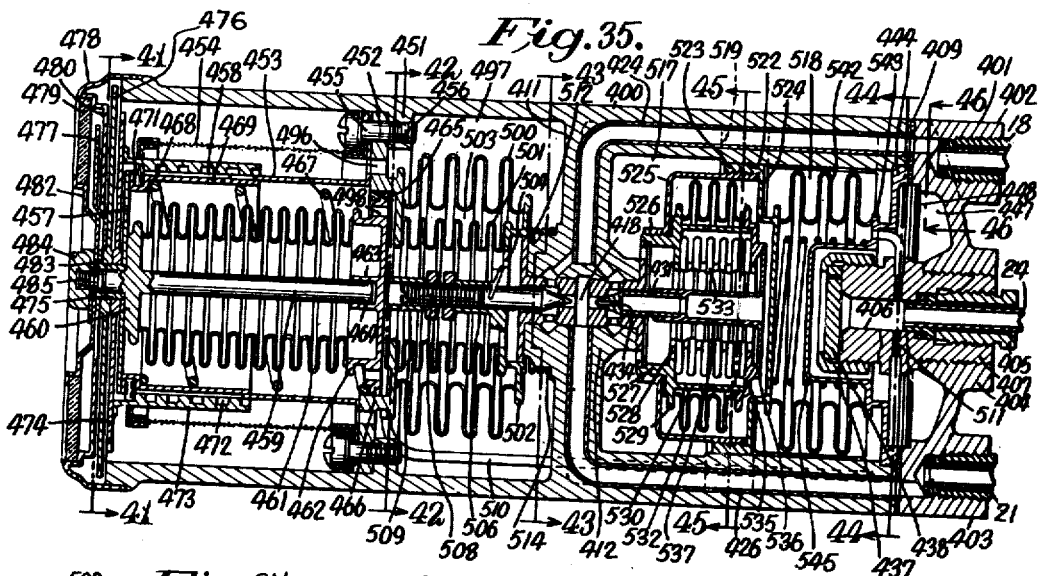

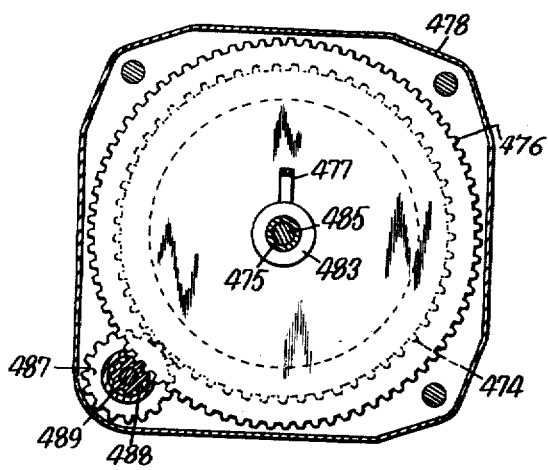
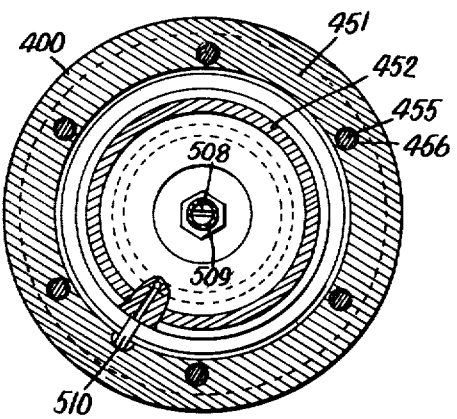
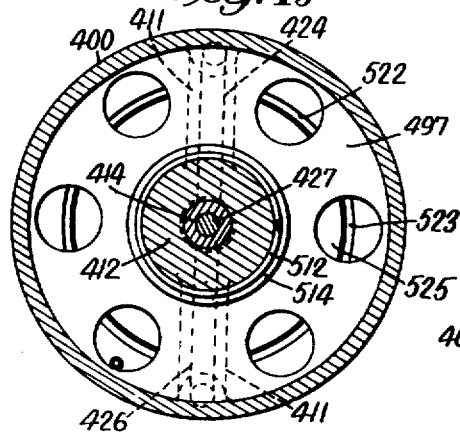
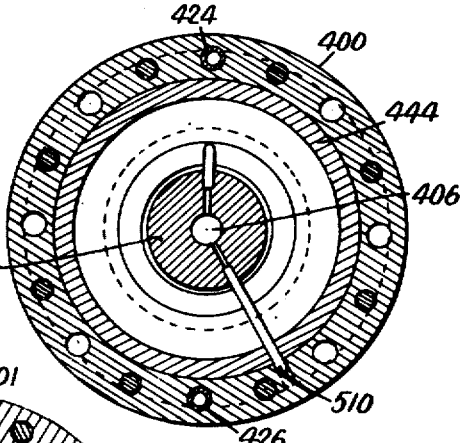
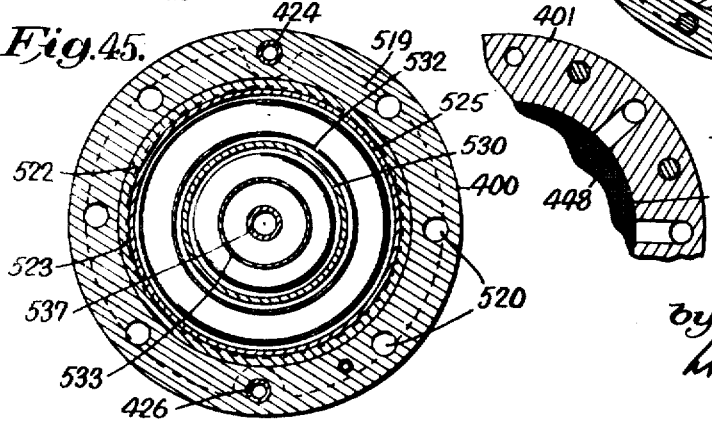

July 26, 1949.　　　　W. W. PAGET　　　　2,477,525
AIR CONDITIONING SYSTEM
Filed Aug. 31, 1943　　　　11 Sheets-Sheet 11
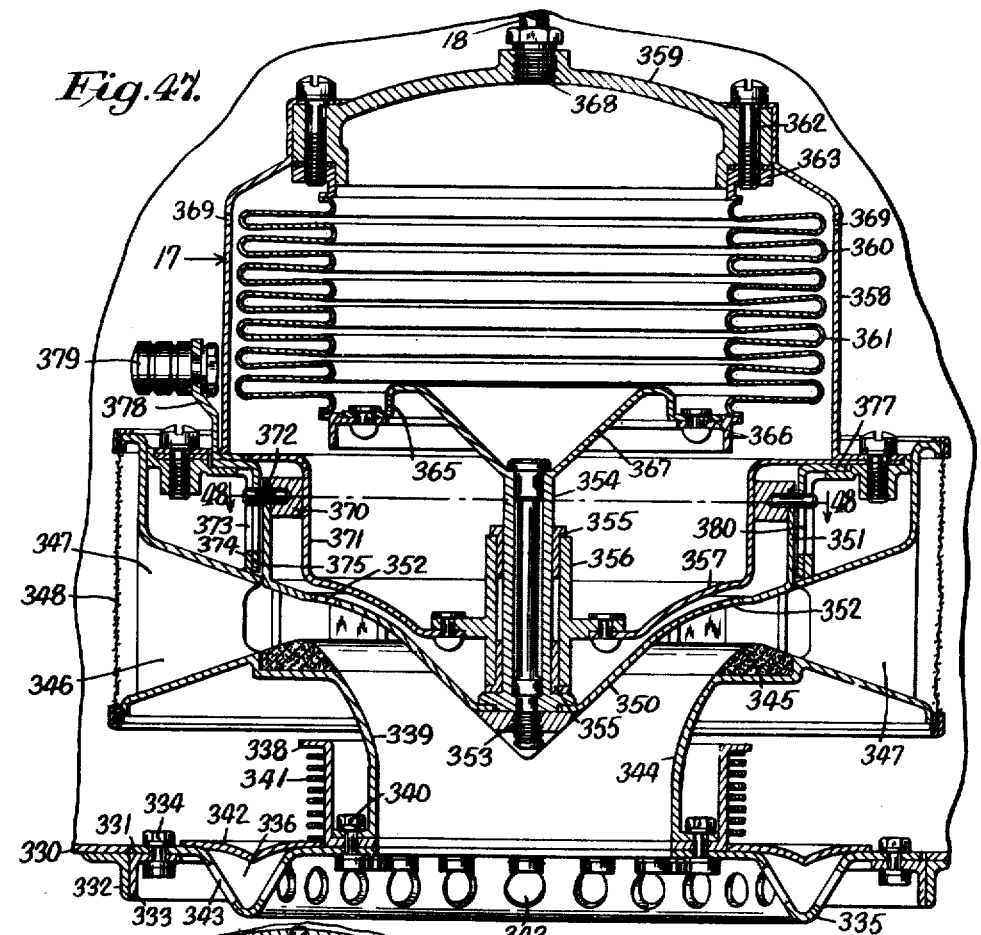
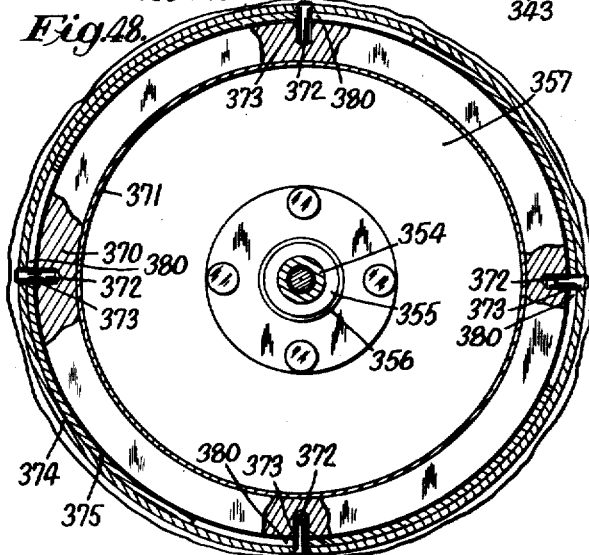
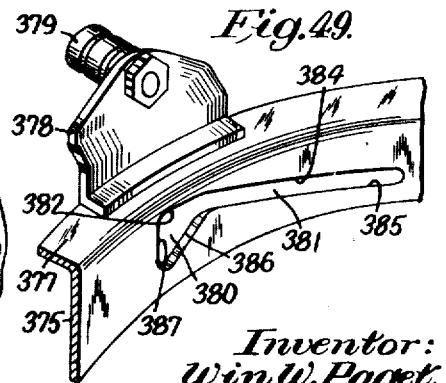
Inventor:
Win W. Paget.

UNITED STATES PATENT OFFICE 2,477,525

AIR CONDITIONING SYSTEM

Win W. Paget, Michigan City, Ind., assignor to Joy Manufacturing Company, a corporation of Pennsylvania Application August 31, 1943, Serial No. 500,677

6 Claims. (Cl. 98—1.5)

My invention relates to air conditioning systems, and more particularly to systems for producing and maintaining proper pressure and temperature conditions automatically in the cabins or other passenger compartments of aircraft which are adapted to be operated at widely varying altitudes.

It is imperative for high altitude flight that the cabins or passenger compartments of aircraft be pressurized. It is permissible that the pressure in the cabin be allowed to follow substantially the variations in external pressure until a predetermined height is reached, for example 8,000 feet. If the elevation of flight is increased rapidly it is preferable not to allow the cabin pressure to reduce as rapidly as the reduction in external pressure occurs. From the elevation of 8,000 feet until a considerably greater height is reached, say 35,000 feet, it is desirable that the pressure in the cabin be maintained relatively constant at approximately the pressure which corresponds to 8,000 feet. It is further desirable that if the plane have occasion to go above the upper limit mentioned, there shall be a variation in the cabin pressure with the changes in altitude so that the cabin pressure may again be reduced as the external pressure becomes lower—where when the plane goes above, say 35,000 feet the cabin pressure will be progressively reduced with higher elevations, and, for example, the same difference between cabin and external pressure which prevailed at 35,000 feet will be maintained through lowering of the cabin pressure. This capacity is very important both because it reduces the danger of damage to the cabin through excessive pressure differential between the inside and the outside thereof, and it also relieves the load on the pressurizing means which has to raise the pressure of the very rarefied atmosphere to cabin pressure and which must work very hard at such extreme heights unless the cabin pressure can be further reduced.

For pressurizing means it is desirable to provide pumping means which shall have a large displacement in small compass and which shall be able actually to compress the air taken in through one or more compressions prior to discharge; to provide pumping means which at many altitudes shall avoid the consumption of unnecessary power and the needless generation of heat by operating as, or substantially as, a mere air displacement device, to provide pumping means whose speed of operation shall be automatically varied in accordance with predetermined changes in engine speed; to provide pumping means which shall automatically change its characteristics from a simple air displacement apparatus to a true compressor when certain conditions obtain, such as, for example, the elevation of the apparatus to a height where the external pressure falls below a predetermined value; and to provide pumping means in which manual control of speed is possible.

In order to maintain the desired pressures in the cabin there may be employed a pressure responsive valve mechanism which controls automatically communication between the interior of the cabin and the atmosphere, said valve mechanism providing free communication, except when the plane increases its altitude of flight too rapidly, between the interior of the cabin and the atmosphere up to a predetermined height, the valve mechanism then operating to vary the communication so that cabin pressures are maintained substantially constant during flight from said predetermined height to a higher altitude, and so that cabin pressures vary directly with external pressures during flight at still higher altitudes.

To obtain desired temperatures within the cabin there is desirably provided suitable heat transfer equipment through which the air passes from the pumping means to the cabin. Since the air delivered to the cabin at high altitudes will be somewhat warmer than the outside air, it is desirable thatt he air supply ports opening into the cabin be located near the windows so as to prevent their frosting over. To prevent an escape of air from the cabin through the pumping means when the latter may be stopped due to some fault of its driving means, there may be provided suitable check valves in the supply line.

An object of my invention is to provide an improved system for pressurizing the cabin of an airplane. Another object of my invention is to provide an improved system for maintaining automatically suitable pressure conditions in the cabin of an airplane during flight at widely varying heights. Still another object of my invention is to provide an improved cabin pressurizing system having means for supplying air continuously to the cabin, and means for controlling the venting of the cabin so as to obtain the desired pressures in the latter. Yet another object of my invention is to provide an improved system for producing the desired pressure and temperature conditions in the cabin of an airplane during flight of the latter at widely varying heights, said system including means for supplying air continuously to the cabin, heat transfer means for regulating the temperature of the air supplied, and valve means for controlling the venting of the cabin to atmosphere.

In the accompanying drawings in which a preferred embodiment of my invention has been shown for purposes of illustration:

Fig. 1 is a diagrammatic view showing my improved pressurizing system arranged for use with a plane of the bi-motored type.

Fig. 2 is an enlarged side elevational view of one of the motor driven superchargers shown in Fig. 1.

Fig. 3 is an end elevation of the apparatus of Fig. 2, viewed from the left-hand end of Fig. 2 and showing the drive end of the apparatus.

Fig 4 is an opposite end elevation of the apparatus shown in Fig. 2, being an illustration of the righthand end thereof.

Fig. 5 is an enlarged central longitudinal vertical section on the plane of the line 5—5 of Fig. 3.

Fig. 6 is an enlarged horizontal fragmentary sectional view on the plane of the line 6—6 of Fig. 4, showing a detail of the hydraulic system.

Fig. 7 is a horizontal longitudinal sectional view on the planes of the line 7—7 of Fig. 5, with parts shown in elevation.

Fig. 8 is a view showing portions of the unloading mechanism shown in Fig. 7 in different positions and with certain additional parts shown in elevation.

Fig. 9 is a vertical sectional view on the plane of the line 9—9 of Fig. 7, with parts shown in full.

Fig. 10 is a vertical transverse sectional view on the plane of the line 10—10 of Fig. 7, showing a detail of construction of the unloading mechanism.

Fig. 11 is an enlarged fragmentary sectional view showing venting means for the unloading valve operating cylinder, the view being taken substantially on the plane of the line 11—11 of Fig. 2.

Fig. 12 is an enlarged horizontal sectional view through the control mechanism at the right-hand end of the apparatus, the view being taken on the same plane as Fig. 7.

Fig. 13 is a fragmentary vertical transverse section on the plane of the line 13—13 of Fig. 12, showing a manually operable control valve positionable to vary the speed of drive of the pumping apparatus.

Fig. 14 is a section on the lines 14—14 of Fig. 13.

Fig. 15 is an enlarged detail sectional view on the axis of the speed-responsive device for controlling the speed of drive of the apparatus.

Fig. 16 is a transverse vertical sectional view taken on the plane of the line 16—16 of Fig. 15.

Fig. 17 is a fragmentary view generally similar to Fig. 15 but with parts shown in elevation and illustrating a different position of the parts.

Fig. 18 is a detail longitudinal sectional view on the plane of the line 18—18 of Fig. 16.

Fig. 19 is a fragmentary detail view showing a locking screw for the governor.

Fig. 20 is an enlarged horizontal sectional view on the same plane as Fig. 7, showing details of construction of the external pressure-responsive unloader valve controlling pilot mechanism.

Fig. 21 is a fragmentary view on the same plane as Fig. 20, showing the parts in different relative positions.

Fig. 22 is an enlarged transverse vertical section on the plane of the line 22—22 of Fig. 5.

Fig. 23 is a longitudinal view on the line 23—23 of Fig. 22.

Fig. 24 is an enlarged fragmentary sectional view on the plane of Fig. 5, showing details of the speed-controlling drive clutch.

Fig. 25, is a vertical sectional view on the plane of the line 25—25 of Fig. 5, showing a portion of the driving gearing.

Fig. 26 is an enlarged transverse fragmentary sectional view showing a detail of the drive mechanism.

Fig. 27 is a fragmentary section on the plane of the line 27—27 of Fig. 26, showing a detail of a roller ratchet.

Fig. 28 is a section on the line 28—28 of Fig. 26, showing another detail of the roller ratchet mechanism.

Fig. 29 is a vertical sectional view on the plane of the line 29—29 of Fig. 7, showing the high pressure head of the pump.

Fig. 30 is a vertical transverse section on the plane of the line 30—30 of Fig. 5.

Fig. 31 is a sectional view taken on the planes of the line 31—31 of Fig. 7, showing the intake end of the supercharger.

Fig. 32 is an enlarged horizontal sectional view of one of the check valves shown in the air supply line in Fig. 1.

Fig. 33 is an enlarged perspective view of one of the aftercoolers shown in the air supply line in Fig. 1.

Fig. 34 is an elevational view of the left-hand end of the controlling mechanism shown in Fig. 35.

Fig. 35 is a central longitudinal sectional view on the plane of the line 35—35 of Fig. 34.

Fig. 36 is a fragmentary sectional view on the plane of the line 36—36 of Fig. 34.

Fig. 37 is an enlarged view of a portion of the pilot mechanisms shown in Fig. 35.

Fig. 38 is an enlarged view of another portion of the apparatus shown in Fig. 35.

Fig. 39 is a transverse section on the plane of the line 39—39 of Fig. 38, showing a detail of the control apparatus.

Fig. 40 is a sectional view on the same plane as Fig. 39, looking in the opposite direction.

Fig. 41 is a transverse section on the plane of the line 41—41 of Fig. 35, showing a portion of the cabin pressure adjusting mechanism.

Fig 42 is a transverse section on the plane of the line 42—42 of Fig. 35.

Fig. 43 is a transverse sectional view on the plane of the line 43—43 of Fig. 35.

Fig. 44 is a transverse section on the plane of the line 44—44 of Fig. 35.

Fig. 45 is a transverse section on the plane of the line 45—45 of Fig. 35.

Fig. 46 is a transverse section on the plane of the line 46—46 of Fig. 35.

Fig. 47 is an enlarged longitudinal sectional view through the vent control valve mechanism shown in Fig. 1.

Fig. 48 is a sectional view taken on the plane of the line 48—48 of Fig. 47, with portions broken away to facilitate illustration.

Fig. 49 is a fragmentary perspective view showing a portion of the de-icing mechanism for the valve mechanism shown in Fig. 47.

Referring to the drawings, and first to Fig. 1, it will be noted that the pressurizing system is shown including two superchargers 1, 1, connected by shafts 2, 2 in drive relation with separate motors 3,3 of a bi-motored plane. It will be understood, of course, that the pressurizing system may include one or more superchargers, depending on the volume of the space to be pressurized, and that the superchargers may be driven by the same motor, if desired. Air is supplied to the superchargers under pressure during flight of the plane, through intake connections 4,4 opening to atmosphere through the leading edges of the wings of the plane. The superchargers discharge the air through aftercoolers 5, 5 to connections 6, 6 communicating with a common conduit 8 past check valves 10, 10. The conduit 8 extends along the lower edges of the windows at the forward end of the cabin 12, and is provided with elongated ports 13, 13 opening into the cabin adjacent the windows so that air supplied to the cabin will pass close to the windows and aid in defrosting the latter. Arranged at the rear side of each of the aftercoolers is a flap 15 for controlling the flow of air over the aftercooler. Suitable means 16 are provided for adjusting the flap 15 in accordance with temperature conditions within the cabin, the flap being adjusted to increase the flow of air over the aftercooler as the cabin temperature increases so as to cause a greater cooling of the air supplied to the cabin. Arranged within the cabin is a valve mechanism 17 for controlling communication between the interior of the cabin and the surrounding atomsphere. The valve mechanism 17 is subjected to different pressures through a conduit 18 under the control of a pilot mechanism generally designated 20, described hereinafter more in detail. The pilot mechanism is connected through a conduit 21 with an atmospheric vent 22 opening through a wall of the cabin. A tank 23 is connected by a conduit 24 with the pilot mechanism 20, and the rate of change of pressure within the tank is restricted, as will be later explained.

*Air pumping mechanism*

Each of the superchargers comprises a main casing part 31 and a pair of coacting rotors 32 and 33. The rotor 32 is a male rotor and comprises four helically arranged lobes 34, the rearward sides 35 of which are shown as generated curves in profile, while the leading or pressure side 36 of each of these lobes is, in profile, substantially in the form of a circular arc. The female rotor 33 is provided, in the form shown, with six helically arranged grooves 37 each adapted to cooperate with the lobes of the rotor 32, and the leading concave surfaces 38 of the groove 37 are in profile substantially in the shape of an arc to coact with the arcuate pressure surfaces 36 of the lobes of the rotor 32, while the following concave surfaces 39 of the grooves 37 are generated curves in profile. It will be understood that with a rotor of this character, a materially shortened sealing line is had for the pockets or working spaces which are formed by the coaction of the rotors with each other. A different form of rotor construction may be used without departing from various aspects of my invention, as for example a construction in which the rotors have their respective lobes and grooves formed with generated surfaces in a well known manner. With such rotors, it will be evident that they will have, as it were, low pressure and high pressure ends.

In either case, the rotors are adapted to operate with space packing; that is to say, they are maintained in such relation to each other, through gearing, that there is no actual contact between the rotors with each other. Each of the rotors 32, 33 is herein shown supported at its ends by stub shafts, the rotor 32 having a stub shaft 40 at its low pressure end and a stub shaft 41 at its high pressure end; while the rotor 33 has a stub shaft 42 at its low pressure end and a stub shaft 43 at its high pressure end. The stub shafts 40 and 42 are supported in suitable bearing sleeves or bushings 44 and 45 supported in bores 46, 47 in an integral end casing portion 48 formed in one piece, as herein shown, with the housing 31. A separate, plural-part head 50 supports ball thrust bearings 51 and 52 in which the stub shafts 41 and 43 are respectively mounted. These bearings position the rotors so that no contact can take place between them and the ends of the casing. The casing 31 is provided with an intake chamber 53 with which an intake passage 54 provided with suitable strainer, or other devices not shown for preventing the ingress of harmful material, communicates, and the intake space communicates with the right-hand, low pressure ends of the rotors, and also for a substantial part of the length of the rotors communicates with the back portions thereof so-to-speak, the portions at the opposite side of the plane which includes the rotor axes, from the discharge. The intake chamber 53 also includes curved recesses 53' extending substantial distances arcuately, the extent of these recesses being such that, in the illustrative embodiment shown, the intake chamber and its component recesses 53' provide intake communication with the rotor chambers over arcs of considerably more than 180°. The extent of the intake port, from the functional aspect, is, with the proportions shown, such that the "trailing" edges of the grooves 37 and of the spaces between the lobes 34 pass out of register with the intake port just before engagement or the start of compression within the tooth grooves and spaces begins. It will be evident, however, that a small amount of overlapping, so-to-speak, would be possible and to depend on the dynamic effect of the incoming air to offset the tendency toward a reversal of flow caused by the initial compression. The casing 31 is provided with a discharge chamber 55 at the left-hand (high pressure) end of the rotors, and another chamber 56, whose purpose will later be described, communicates with the chamber 55 though it is separated therefrom for a substantial distance by a web 57. The discharge chamber communicates with the high pressure ends of the rotor chambers, as shown in Fig. 29.

For the purpose of maintaining the rotors out of contact with each other they are connected by intermeshing helical gears 60 and 61, the gear 60 being splined, as at 62, to the stub shaft 41, and the gear 61 being splined, as at 63, to the stub shaft 43. The gears 60 and 61 are so formed that their helix angles correspond in hand and lead to the helix angles of the rotors to which they are respectively fixed. Regardless of the speed at which the rotors turn, these gears operate to maintain the space packing heretofore referred to; in other words, a very small clearance between the surfaces of the lobes and the sides and bottoms of the grooves of the rotors is maintained, thus preventing wear and permitting the operation of the pump at a speed far exceeding any permissible with rotors running in contact with each other. By reason of the smallness of the clearance maintained and the high speeds of rotation, serious leakage is prevented.

A drive shaft 70, preferably driven through a flexible non-back-lash drive such as, for example, that disclosed in my application Serial No. 443,414, filed May 18, 1942, is arranged in alinement with the stub shaft 43 and has a driving connection therewith as shown at 71. The drive shaft is journaled by means of a ball bearing 72 carried by the plural-part head 50 and engaging a cylindrical portion 73 on the drive shaft. Its other end is rotatably supported as later described. Surrounding a cylindrical hub portion 79 of the gear 61 is a bearing sleeve 80, and a cylindrical portion 81 at the right-hand end of the drive shaft 70 rotatably surrounds the bearing sleeve and is journaled thereon. Keyed to the periphery of the cylindrical portion 81 of the drive shaft is a member 82 having a number of recesses 83 formed therein receiving rollers 84 which are operative, as later described, at times to effect a clutching between the member 82 and a cylindrically bored liner ring 86 keyed, as at 87, to the gear 61. The recesses 83 have, as shown in Fig. 26, relatively straight base surfaces 90 and radial surfaces 91. Through the latter surfaces there project spring-pressed plungers 92 adapted to act upon the rollers 84 and cause them to connect the members 82 and 86 upon predetermined relative rotation between the latter members. Springs 93 act against cross pins 94 and move the plungers 92 against the rollers 84. The pins are supported in end closure or plate members 97 and 98, and the rollers have stems 99 loosely received in openings 100 in the plates 97 and 98. These plates 97 and 98 are supported to turn with the member 82. It will be evident, referring to Figs. 25 and 26, that if the member 82 be driven counterclockwise it will, through the rollers 84, be connected to the liner ring 86 and through the latter drive the gear 61, and by virtue of the connection of gear 61 to shaft 43 drive the rotor 33, while through the meshing of gear 61 with gear 60 and the mounting of gear 60 on shaft 41, rotor 32 will also be driven. If the gear 61 be driven counterclockwise at a greater angular rate than the member 82, it will not be connected to that member and may turn freely in the direction mentioned, relative to it.

It will be noted (Fig. 5) that the stub shaft 41 has another shaft 102 connected with it by means of a splined connector element 103 which has an axial bore 104 for reasons later explained. The left-hand end of shaft 102, as viewed in Fig. 5, is journaled in a ball bearing 106 carried by the plural-part head 50, and carries a gear 107 somewhat smaller than the gear 60. A gear 108, somewhat larger than the gear 61, meshes with the gear 107 and is journaled by a ball bearing 110 on a cylindrical portion 111 of the drive shaft 70. It also has a sleeve portion 112, internally splined at 113 and supported by a ball bearing 114 on a further cylindrical portion 115 of the drive shaft 70. Discs 117 connected, as shown in Fig. 24, to the sleeve portion 112 are interleaved with other discs 118 connected by splines 119 to the drive shaft 70, which has a flange 120 adjacent the bearing 114 serving as an abutment for the end one of the interleaved series of discs 117, 118 when these are pressed together to connect the gear 108 to the drive shaft 70. A follower member 122 is slidably supported on a packing ring 123 mounted on the shaft 70 and has an annular outer sleeve portion 124 with whose bore a peripherally packed plate 125 coacts to form a chamber 126 for clutch applying hydraulic pressure. A ring 127 seated in an internal groove in the sleeve portion 124 provides an abutment for a flexed annular spring 128 whose opposite side presses upon the side of the plate 125, and the spring 128 normally maintains the follower member 122 in clutch unloading position.

It may now be noted that when the clutch is loaded, the gear 108 will be connected directly to the shaft 70 and will drive the gear 107 and so the gears 60 and 61, and thus the rotors 32 and 33; and because the gear 61 will then be rotated faster than the member 82, and in the same direction with the latter, there will simply be an overrunning clutch action and no tendency for connection between gear 61 and member 82.

It will be evident from what has been said that the drive shaft 70 is rotated counterclockwise in Fig. 3 and that the rotor 33 turns clockwise in Fig. 30 while the rotor 32 turns counterclockwise in the same figure, and that air taken in through the intake connection 54 is entrapped between the casing and the rotors and is progressively moved, and if it remains entrapped, compressed as it is moved to the discharge connection 55.

The compressor has automatic means for effecting change in the manner (and accordingly in the speed) of drive thereof governed by a speed responsive device and it has automatic means for effecting the initiation of compressive action thereby governed by the pressure of the air surrounding the airplane. Both of these automatic means are hydraulically operated, so, having described the hydraulic clutch operating means which effects high speed drive of the compressor, I shall briefly describe the hydraulically controlled means for initiating compressive action, and then describe the hydraulic system and its controls which effect the operation of the clutch and the unloading means.

Referring particularly now to Figs. 7, 29, 30 and 31, it will be observed that the casing 31 at the intake side does not fit at all closely to the peripheries of the rotors, and that there are, as previously described, arcuate intake grooves 53' which extend at the intake end of the pump somewhat more than 90° in one case and somewhat less than 90° in the other past the plane which includes the axes of rotation of the rotors, but that there are wall portions respectively marked 132 and 133 which except for clearance adequate to constitute space packing do conform or fit quite closely to the cylinders traced by the outermost portions of the rotors and that these portions 132 and 133 intersect along a line 134 parallel to the rotor axes. Now, the fluid which is "sealed" in the successive progressively diminishing chambers between the rotors and the casing walls would be substantially compressed if no escape or discharge were provided between the times pairs of tooth spaces or grooves move out of communication with the grooves 53' and the instant that the leading edges of the tooth spaces come into communication with the discharge 55; and under certain conditions such compression is very desirable. But under other circumstances it is better to avoid material compression and thus conserve power and avoid unnecessary heating of the cabin. Accordingly, I have provided an opening at 135 so related to the length of the casing and the helix angle of the rotors that when the opening 135 is unobstructed no compression of the fluid enclosed between the rotors 32 and 33 will take place before communication with the opening 135 is had; and the relationship of the opening 135 to the discharge passage 55 is such that the air remaining in the pockets in the rotors as these pockets move out of communication with the openings 135 will not be compressed before these same pockets communicate with the discharge 55. It may thus be noted that the position of the ends of the intake grooves 53' and the position and dimensions of the opening 135 are such that with the helix angles of the rotors used, tooth pockets whose "trailing" edges are just ceasing to communicate with the intake are just about to commence to have their forward edges pass over the opening 135; and that as the "trailing" edges of tooth pockets approach their points of final communication with the opening 135 when the latter is open they have their leading edges pass beyond the edge of the final discharge opening, whereby there is displacement, but not compression, of fluid when the opening 135 is not closed by the valve 136. However, when valve 136 is closed, there is a substantial compression of the fluid between the time the tooth spaces cease to communicate with the grooves 53' and move into communication with the discharge 55.

To control the opening 135, which has a peripheral wall which lies in the surface of a cone, I have provided a valve 136 whose shape is such that when the same is closed it conforms very closely to the walls 132 and 133, as may be seen in Fig. 10. This valve has ears 137 through which pins 138 pass, and these pins are secured in the arms or flanges 139 carried upon a pivotal support member 140 which is secured, by a pivot pin 141, to the wall of the casing 31. A shoulder 142 on the valve and a shoulder 143 on the casing limit the closing movement of the valve 136 to a position in which the walls of said valve conform exactly to the surfaces of the rotor chambers. This valve is adapted normally to be maintained open by a spring 145 engaging at one end the wall of a member 146 which forms a portion of the enclosure of the discharge chamber 56 and which is secured, in any suitable manner, to the casing 31. The other end of the spring acts against a piston 147 having a packing 148 fitting the walls of a cylindrical chamber 149 which is formed in a cylinder-providing member 150 also secured, in any suitable manner, to the casing 31 in a position overlying the member 146. A piston rod or operating stem 152 with an elongated eye 153 is connected at its outer end to the piston 147, and by means of the eye and a pin 154 is connected to the valve 136. The piston 147 and the member 150 cooperate in forming a servo-motor 155 to which fluid may be admitted through a connection or passage 156 under a control hereinafter described, and a leakage port 158, shown in Fig. 11, is provided to conduct any liquid which may escape past the packing 148 to an oil sump 160 in the lower part of the casing 31. When the servo-motor 155 is not under pressure delivered through the passage 156, the valve 136 may be moved to the open position shown in Fig. 8 by the spring 145, and in that inclined position it will offer very little obstruction to the discharge of fluid to the chamber 56 and thence to the interior of the cabin through any appropriate connection. When, however, pressure is supplied under certain predetermined conditions to the servo-motor 155, the piston 147 will be caused, through the operating stem 152 and the pin 154, to close the valve 136, and the compressor will then operate substantially precisely as though there were no opening 135 available. Thus depending upon the position of the valve 136, there is provided by the single unit in effect a mere displacement pump and a compressor capable of substantial compression of air taken in. That this compression may be in practice from one very substantially subatmospheric pressure to a higher one which is itself less than atmospheric does not, of course, alter the fact that there is a definite compression.

As previously indicated, the change in speed of operation of the compressor and the loading and unloading are both hydraulically controlled, and I shall now describe the hydraulic system. There is provided in the base of the casing 31 the sump 160. This sump is disposed between the lower wall of the rotor housing and an outer wall 161 forming an integral part of the casing 31. The chamber is, in the horizontal position of the compressor, substantially horizontal, and a pump of the intermeshing gear type is positioned at the right-hand end of the casing as the same is viewed in Fig. 5, so that it is partially submerged and so that its intake is always submerged (in the horizontal position of the casing) in the oil in the sump. This pump, designated 162, includes a casing 163 having intersecting rotor chambers 164 therein, Fig. 22, in which are rotors 165 having intermeshing teeth 166 arranged at a slight angle to elements of the cylindrical surface in which the outermost points in the rotor teeth lie. An intake passage 167 conducts oil to the lower sides of the rotors 165, and the oil is carried around by the teeth 166 and is discharged to a discharge space 168 above the plane of the mesh line of the rotors 165. One of the rotors 165 drives the other, and the first mentioned rotor is provided with a shaft 169 which extends through a ported cover plate 170 and carries a gear 171 which is in turn driven by a pinion 172 rotatably supported on a sleeve member 173 later more fully described. A larger gear 174 is herein shown as formed integrally with the gear 172, and the gear 174 is driven by a pinion 175 formed integral with the stub shaft 42 and arranged at the extreme right-hand end of the latter in Fig. 5. A clean-out plug 176 is arranged below the oil pump in the bottom of the sump. The discharge passage 168 communicates with passages 178 in the cover 170, and 179 in a supplemental cover, and opens into the bore 180 of the sleeve member 173 previously mentioned. From the bore 180 the fluid is discharged through branch passages 181, Fig. 6, into a chamber 182 containing a strainer structure 183. Between the ends of the chamber 182 and suitably associated with the strainer is an annular peripheral member having a peripheral groove 184 to which the strained lubricant obtains access through radial ports 185. The annular groove 184 communicates with a passage 186 which opens into an annular groove 187 surrounding the bearing bushing 45. The opposite side of the annular groove 187 opens into a passage 188 whose upper end opens into a chamber 189. The chamber 189 constitutes a distribution point for oil for lubricating purposes and for operating the speed-changing clutch mechanism previously described and also for fluid for closing the valve 136 previously mentioned. In line with the passage 188 there is another passage 190 opening outwardly and upwardly from the chamber 189. This communicates with an annular groove 192 in the bushing 44. The annular groove has continuously in communication with it obliquely disposed passages 193 opening into a chamber 194 in the stub shaft 40. The chamber 194 is connected by a tube 195 suitably centered as at 196 within the rotor 32, and at the left-hand margin of Fig. 5 the tube 195 opens into a chamber 197 in the stub shaft 41. As will be apparent from what has been previously described, the chamber 197 communicates through the passage 184 with a hollow interior 188 of the shaft 162 and discharges through the left-hand end of the latter, as shown in Fig. 5, into a chamber 199 formed in the multipart head structure 50. Fluid is delivered from the chamber 199 through a lubricant tube 200 into a chamber 201 between the rotor casing and the chamber 199 and which forms an enclosure for the motor driving gear earlier described. The lubricant tube 200 has two discharge orifices 202 and 203 which respectively discharge lubricant onto the peripheral surfaces of the gear couples 107, 108 and 60, 61, thereby keeping the gear couples 60, 61 and 107, 108 adequately lubricated. The lubricant, after its discharge over these gears, passes downwardly within the chamber 201 and is conducted out of the casing through a passage 205 and a tube 206 of small diameter opening through the side wall of a larger tube 207 back into the sump 160. Lubricant is also discharged directly through the tube 207 back into the sump 160. The presence of the branch tube 206 of small diameter prevents all of the lubricant in the sump 160 from flowing into the chamber 201 when the airplane has occasion to make a dive. A drain plug 208 is arranged in a position to permit the draining of lubricant from the chamber 201.

It will be noted that in the stub shaft 40 there is, at the right-hand end of the chamber 194, a partition 210 to the right of which there is a valve-receiving bore 211. Obliquely extending passages 212 connect the annular groove 192 with the bore 211 at points near the partition 210, and a further annular passage 213 formed in the bushing 44 is connected with the interior of the bore 211 by radial passages 214. Suitably supported on the rear end of the stub shaft 40 is a mounting 215 for a speed-responsive governor 216 which serves in conjunction with a spring 217 housed in the interior of a valve member 218, to vary the position of that valve member in the bore 211. The valve member will be observed to be open from end to end, as at 220, and to house the spring 217 within it in such a manner that the spring acts on the right-hand end of the valve in Fig. 15 at one end and at its other end acts on the partition or wall 210. The valve has a left-hand end collar 222, another annular peripheral collar 223 spaced by a groove 224 from the collar 222 and a further enlarged collar—right-hand portion 225— spaced by a peripheral groove 226 of substantial length from the collar 223. The support member 215 has a portion 227 guidingly engaging the portion 225 and is traversed by openings 228 so that in in certain positions of the valve 218 there may be a discharge into a chamber 230 at the right-hand end of the compressor, of fluid entering the chamber 211 through the radial passages 214.

The governor 216 includes fly weights 232 pivotally supported on tranverse pins 233 in earlike portions 234 carried by the support 215. Portions 235 of the fly weights at the opposite side of the pivots thereof from the main masses of said fly weights carry adjustable screw devices 236 which have heads 237 adapted to engage the right-hand end surface of the valve 218, and upon the attainment of the shaft 40 to a predetermined speed of rotation the fly weights actuate the portions 235 to move the valve 218 to shift the valve from the position shown in Fig. 15 to that shown in Fig. 17, thereby allowing fluid entering the bore 211 through the radial passages 214 to be vented while at the same time preventing any delivery of fluid from the pump to the radial passages 214. The cutting off of the supply of fluid to the radial passages 214, and the venting of fluid from these passages through the bore 211 will effect, as shortly described, a reduction in the speed of the rotors. This reduction in speed, however, will not be sufficient to effect an operation of the speed governor permitting the valve to move again to a position for supplying fluid to the passages 214, as the design of the governor is such that it becomes operative to force the valve 218 to the left only upon the attainment of a speed as of the order of 7000 R. P. M., while after once assuming the position of Fig. 17 a falling off of the speed to a lower speed of the order of 4000 R. P. M. will be necessary before the weights will be moved in and permit the reestablishment of fluid delivery to the chamber 126 of the hydraulically operated clutch mechanism.

The circumferential groove 213 is connected below the stub shaft 40 with a passage 241 which extends downwardly parallel to the axis of the passage 190 and opens through an opening 242 into the interior of the bore of a valve-receiving bushing 243. This valve-receiving bushing contains a rotatable valve 244, which is used primarily for testing purposes and which has an operating handle 245 by means of which the valve may be turned into any one of three different positions. In the position of the valve 244, shown in Fig. 5 and in Fig. 12, a diametric passage 246 connects the opening 242 with an opposite opening 247 in the valve sleeve and via the latter opening to the passage 248 which is connected through a port 249 in the bearing sleeve 45 and an annular groove 250 and radial passages 251 with a chamber 252 within the interior of the stub shaft 42. The outer end of this chamber 252 is closed by a plug 253, while the other end of the chamber 252 is connected by a suitably centered tube 255 with arrangements for effecting the operation of the clutch mechanism previously described and for the performance of certain lubricating functions. Before proceeding with the description of this mechanism, it may be pointed out that the valve 218 at speeds of the rotor 32 below a predetermined number of R. P. M. will be in the position shown in Figs. 5 and 15 and will connect the pump discharge through the ports and passages previously described with the tube 255, but that at speeds above such a predetermined number of R. P. M. the valve 218 will assume the position shown in Fig. 17 and cut off communication completely between the passages 190 and 241 and to vent 241 back to the sump through the chamber 230. Now it will be observed, referring particularly to Figs. 5 and 24 that at the left-hand end of the tube 255 there is a bell or funnel shaped member 257 fitting a bore 258 of the stub shaft 43, and that a split spring ring 259 operates to prevent possible movement of the member 257 out of the bore in the stub shaft if any loosening should occur. Within a stepped bore 260 within the drive shaft 70 there is arranged a hollow plunger member 261 which is provided at one end with a perforated flange 262 adapted to seat against a split ring 263 secured within the inner wall of the drive shaft 70. The plunger member 261 is engaged by a spring 264 which reacts against a shoulder 265 within the drive shaft, and a thimble 266 closes the left-hand end of the chamber within which the element 261 is movable. The interior of the chamber communicates, through obliquely radially extending passages 267, with the outside of the drive shaft between the ball bearings 72 and 110. Other radially obliquely extending passages 268 connect the interior of the stepped bore 260 at the right-hand end of the plunger member 261 in communication with the chamber 126.

The mode of operation of the mechanism which has just been described is as follows: When the compressor is started, a driving connection is immediately established between the shaft 70 and the gear 61, and the pump 162 commences to deliver fluid through the strainer, through the passage 186, the chamber 189, the passage 190, the oblique passages 212, the annular groove 224, the radial passages 214, passages 241, 246, 248, 251 and the tubular conduit 255 to the interior of the member 257 and to the space between that member and the plunger member 261. The fluid immediately passes through the perforations in the flange 262 and through the radial passages 268 into the chamber 126 and brings the clutch discs 117 and 118 into contact with each other. As the oil continues to flow through the tube 255, the member 261 moves to the left compressing the spring 254, and the compression of this spring is so determined that the clutch pressure will be gradually applied as the member 261 moves to the left. When this member reaches its extreme left-hand position, the clutch discs may be firmly pressed against each other and drive of the rotors at the higher speed, when the gear 108 is the driving element, will be effected. It will be appreciated that this high speed driving will be continued until the speed of the compressor builds up to such a degree that the valve 218 will be shifted by the governor, and then the slower speed drive between the shaft 70 and the compressor will be initiated. It will be noted that lubricant will be supplied from the space between the member 261 and the member 257 to the splines.

The manually operable valve 244 previously mentioned can be adjusted as previously described to such a position as to restore high speed drive of the compressor after such high speed drive has been automatically interrupted, or to prevent interruption of high speed drive upon the attainment of the predetermined speed of operation at which a shift to low speed drive is normally effected. Furthermore, in another position of adjustment, this valve may be so operated as to preclude the high speed drive completely. It will be noted that in addition to the diametric passage 246 formed in the valve there is a longitudinal peripheral passage 270, Fig. 14, which opens into the space 271 at the right-hand side of the valve, a space which is connected by a passage 272 (Fig. 5) with the chamber 230 which communicates with the sump. When the valve 244 is turned to bring the passage 270 into communication with the passage 248 and to blank off the port 242 with the cylindrical portion of the valve opposite the groove 270, it will be evidently impossible to transmit pressure through the tube 255 for effecting high speed drive of the compressor. The valve 244 also has an oppositely extending longitudinal peripheral groove 274 opening through its end which forms a portion of the bounding wall of the chamber 189. When the valve is turned so as to bring the passage 274 into communication with the passage 248, fluid will be supplied from the chamber 189 continuously to the passage 248 and the tube 255 and high speed drive of the compressor will alone be possible. Referring to Figs. 4 and 5 it will be apparent that means is provided for locking the handle 245 of the valve 244 either in midposition where the drive of the compressor is controlled by its speed automatically by the speed governor or in either of the other two positions mentioned.

The chamber 189 has a laterally extending passage 276 (Fig. 12) communicating with the same. This passage is adapted to be connected by a longitudinally extending passage 277 under the control of a spring loaded valve 278 with a passage 279 opening into an annular chamber 280 which surrounds the sleeve 243 and which is connected at its opposite side with a passage 281. The function of the spring loaded valve 278 is to maintain a sufficient pressure in the chamber 189 under all circumstances when the compressor is running to insure the operation of the speed change mechanism. The passage 281 has a bore 282 communicating with it, and a valve 283 reciprocates in the bore. A side vent 284 opens out of the bore and leads into the space 230, and a spring 285 having an adjustable follower 286 is adapted to control the pressure in the passage 280. The passage 281 communicates through a port 288 with a bore 289 of a valve seat member 290 mounted in a passage 291 which is connected by another passage 292 to the passage 156 leading to the chamber 155 to which fluid is supplied to actuate the valve 136. It will be evident that if through escape from the bore 289 is prevented fluid will be supplied to the servo-motor 155 at a pressure determined by the valve 283 and that again, subject to the same condition, the valve 136 would be closed whenever the pump 162 was being driven. However, means is provided whereby the pressure is vented freely from the bore 289 back to the sump at all times when the airplane is operating at levels where the external pressure is below a predetermined amount. It will be observed that the valve seat member 290 is provided with a plurality of ports 294 (Figs. 12, 20 and 21) opening through a surface surrounded by an annular valve seat 295 and that there is further provided a central guide extension 296. Reciprocably mounted upon this guide extension is a valve element 297. The movement of this valve element in an opening direction is limited by a sleeve portion 298 formed on a threaded sleeve member 299 which is supported in a further sleeve mounting element 300 carried by a wall of the casing 31. An adjustable closure element and spring tension regulator 301 engages a spring 302 which acts upon the valve 297 and normally tends to seat it. Connected to the valve 297 and to the sleeve member 299 at opposite sides of the sleeve portion 298 are bellows devices 303 and 304 bounding a chamber 305 in which the sleeve 298 is enclosed, and this sleeve is perforated so that free communication may at all times exist throughout the interior of this chamber. The chamber 305 is evacuated, and the compression of the spring 302 is so determined that until the pressure acting upon the exterior of the bellows arrangement falls to a predetermined low value, the valve 297 will be held firmly open against the stop sleeve 298. When, however, the pressure in the casing 300 falls below a predetermined value, the valve 297 will promptly seat and interrupt the discharge of fluid back to the sump and cause the building up of such a pressure in the chamber 155 as to close the valve 136 and cause the compressor to operate as a "compressor" instead of a displacement means. It will be noted that the walls of the casing 300 are perforated as at 309, 310 to permit the fluid passing through the passages 294 to flow freely to the sump through the chamber 230. The chamber 230 is connected to external pressure—pressure outside the cabin—through a pressure device of any suitable construction as shown at 311 (Figs. 4 and 7), and a similar device, 311' (Fig. 3), connects the chamber 201 to atmosphere. The setting of the spring 302 is such that the valve 297 is normally open at heights of the airplane below 25,000 feet. The valve 297 is of the "overbalanced" type, being of the sharp opening variety, so that when the valve 136 is to open, it may be permitted to open sharply and cleanly. Extending axially through the guide extension 296 is a passage 312 through which fluid passes from the bore 289 to the interiors of the sleeve member 299 and the bellows device 304. When the valve 297 is seated, fluid supplied under pressure through the passage 312 acts against the outer end of the valve and counteracts the increase in pressure on the inner end of the valve produced by the fluid acting through the ports 294.

It will be noted that the rotor 33 is hollow from end to end and that passages 313, 314 connect the space surrounding the left-hand stub shafts 41, 43 with the interior of the rotor, while passages 315 extend through the stub shaft 42, so that any tendency of lubricant to enter the rotor spaces is prevented by pressure equalization. The casing 31 has cooling fins 316.

An extended summary of the mode of operation of the illustrative embodiment of the invention which has now been described in detail is not necessary in view of the explanations given of the modes of operation of the component parts. It may be noted, however, that when the airplane takes off each compressor will have its valve 136 open and will simply move large quantities of air at take-off conditions into the cabin. When each compressor is caused to rotate, it will be started initially at the slower speed, drive being from the drive shaft 70 through the automatic roller clutch mechanism to the gear 61. As soon as the compressor has operated long enough to produce the necessary oil pressure in the system—a thing which occurs almost instantly—the high speed drive of the compressor rotors will be initiated unless the manual control valve 244 should have been moved to prevent this—an unlikely condition as this valve is used mainly for test purposes. Obviously, if a substantial period of idling is desired prior to take off, this valve could be so manipulated as to prevent the needless displacement of air by the compressor. As soon as the compressor driving speed attains to a certain predetermined number of R. P. M., the automatic speed governor mechanism will shift the valve 218 to substitute the low speed drive for the high speed drive by interrupting the supply of clutch loading pressure to the friction clutch loading member 122. Thus during the relatively high speed operation of the compressor during flight the low speed drive will be in operation. The nature of the governor is such as to avoid hunting, and when the speed of the compressor is brought up to a value sufficient to initiate low speed drive there will be required a greater reduction in speed than will be occasioned by the change from one drive to the other before the compressor will again shift back to the high speed drive. If the airplane rises to the requisite height so that compression of the air instead of displacement thereof is necessary for satisfactory operation, the evacuated diaphragm will permit the closing of the valve 297 and there will be fluid supplied to the piston 147 of the servo-motor 155, and the valve 136 will be closed and the compressor will then operate to compress the fluid, and all of the fluid taken in will be discharged through the regular discharge passage 55. It will be evident that the compressor will be adequately lubricated at all times and that a pump of the character shown has such capacity for the moving of lubricant that a very effective delivery of lubricant to the points requiring lubrication will be assured.

*Air supply system*

Air discharged from the supercharger is conducted through a connection 320, Fig. 33, to the interior of a funnel shaped member 321 where it enters a series of laterally spaced tubes 323 of the aftercooler 5. The tubes are supported in spaced relation by plates 324 so as to provide spaces through which air may pass from a propeller of the plane transversely over the tubes. As the air discharges from the tubes it enters a funnel shaped member 325 connected in communication with the connection 6. As shown in Fig. 32, the connection 6 is connected in communication with a passage forming portion 327 of the check valve 10. The portion 327 opens into a chamber 328 which communicates, at a point spaced laterally of the passage portion, with the conduit 8. Arranged within the chamber 328 is a valve member 329 urged continuously by a spring 330 toward the inner end of the portion 327 for closing the latter and preventing an escape of air from the chamber 328 toward the supercharger.

*Cabin vent valve mechanism*

The valve mechanism 17, as shown in Figs. 1 and 47, is supported by a wall 330 of the airplane cabin over an opening 331. Connected to the cabin wall surrounding the opening 331 are reinforcing rings 332 and 333, and attached to the ring 333, as by bolts 334, is an annular member 335 bent to form an annular V-shaped groove 336. A Z-shaped annular member 338 and a valve casing 339 are connected, as by bolts 340, to the inner edge of the annular member 335. Surrounding the member 338 is a coiled spring 341 bearing against the inner flange portion of the member 338 and against an annular valve member 342 which seats on the member 335 at opposite sides of the groove 336 for controlling communication between the interior of the cabin and the surrounding atmosphere through ports 343 in the member 335. The valve casing 339 has a discharge orifice 344 communicating with atmosphere through the inner opening of the annular member 335. A valve seat of fibre or other suitable material is provided at 345; and a generally annularly arranged discharge passage 346, partially cut up into sectors by supporting flanges 347, is surrounded by a screen 348 which serves to prevent the possibility of any objects from within the cabin obtaining access into the interior of the valve mechanism and thereby interfering with its operation. Cooperating with the valve seat is a vent valve 350 which is relatively conical at its outer end and is provided with a cylindrical portion 351 at its inner end. The vent valve is of the approximately balanced type, and is traversed by openings 352 so that the pressure at its opposite sides may be equalized. The valve is mounted in any suitable manner, herein by means of a nut and shoulder arrangement 353 at the outer end of an operating stem 354 which is guided in bushings 355 supported in a sleeve-shaped member 356 attached to a wall 357 of the valve casing. The casing 339 carries a housing portion 358 supporting a cover member 359. An expansible chamber device 360 is enclosed within the housing portion 358 and comprises a bellows 361 secured at one end in sealed relation by studs 362 and an annular end element 363, with the housing portion 358 and the cover member 359; and the other end of the bellows is connected to a head 365 comprising a ring member 366 and a conical portion 367 formed integral with the stem 354. The conduit 18 is connected at 368 within an opening in the cover member 359. Openings 369 connect the interior of the casing 358 with cabin pressure. When the cabin pressure materially exceeds the pressure within the bellows 361, the valve 350 will be opened. When the pressure within the bellows is the same as cabin pressure, the valve 350 will be closed.

Secured to the cylindrical portion 351 of the valve 350 is a ring 370 guided on the outer wall of a cylindrical portion 371 of the valve casing. Projecting outwardly from the portion 351 are pins 372 extending through slots 373 in a surrounding wall portion 374 of the casing. Between the valve portion 351 and the wall portion 374 there is rotatably mounted a cylindrical member 375 having a radial flange 377 to which there is welded an upstanding operating flanged portion 378 carrying a button or finger piece 379. The member 375 is traversed, as shown in Fig. 49, by a series of openings each including a relatively right triangular portion 380 and a communicating helically extending elongated portion 381. The inner wall 382 of the portion 380 lies in a plane perpendicular to the axis of the mechanism. The walls 384 and 385 of the helically extending portion 381 extend obliquely outward. The outer wall of the portion 380 is relatively sharply inwardly inclined, as at 386. The bottom wall of the portion 380 is horizontal, as at 387. Now it will be evident that by turning the member 375 counterclockwise, in terms of directions looking down upon the valve device in Fig. 47, and causing the helically disposed portions 381 to engage the pins 372, the valve 350 may be adjusted to and held in substantially any desired portion. It will further be observed that when the member 375 is left in the position indicated in Fig. 47, the valve may move freely back and forth without interference from this member. It will also be evident that when the valve is nearly closed, if the same becomes stuck by ice or the like, the surface 386 may be caused to wedge in the valve and because of its steepness can be used to cause the valve to reciprocate rapidly and thus to free it from ice.

*The pilot, controlling valve mechanism*

The pilot mechanism 20 comprises, Fig. 35, a casing 400 having a head 401 secured thereto in any appropriate manner. The head 401 has a boss 402 in which the connection 18, at its end remote from the cabin vent valve mechanism 17 is mounted, and a further boss 403 in which the conduit 21 leading to the exterior of the cabin, is appropriately mounted. It also includes a central boss 404 in which there is a mounting 405 for securing in leak-tight relation with respect to a chamber 406 formed in a plug member 407 the end of the conduit 24 which is remote from the tank 23. The plug 407 is threadedly connected within the central portion of the head 401. The joint between the head 401 and the casing 400 is a gasketed one, as indicated at 409. The casing 400 is provided at a point near its longitudinal center with suitable supporting means, herein shown as arms 411, for supporting a centrally arranged body 412 within whose interior certain valve mechanism is arranged. The body 412 is traversed by a longitudinally extending bore 413 into which, from the opposite ends thereof, there extend plug members respectively numbered 414 and 414'. Each of the plug members 414 and 414' is traversed at its outer portion with a bore 415 opening into a central chamber 416, and each of the plug members has a smaller opening 417 alined with the opening 415 and opening into a space 418 between the plug members. The space 418 will be observed, in the construction shown, to be bounded peripherally by the wall of an annular groove 419 formed in the body 412 and by the end surfaces of the plug members 414 and 414'. Each of the chambers 416 is connected by radial passages 420 with an annular groove formed in the body 412, the annular groove associated with the plug member 414 being designated 421 and the annular groove associated with the plug member 414' being designated 421'. The grooves 421 and 421' are connected by oblique passages 422 and 422' respectively with a bore 423 of a conduit 424, which may be a brass pipe around which the aluminum of the casing is cast; and the conduit 424 extends into communication with the conduit 18 where the latter is mounted in the lug 402. The central space 418 is connected with the bore 425 of a conduit 426 which extends into communication with the conduit 21 where the latter is secured within the lug 403. A valve member 427, comprising a cylindrical body portion 428 movable within the bore 415 in the plug member 414 and a tapered portion 429 adapted to coact with the outer end of the passage 417 in the plug member 414, controls the communication between the bores 423 and 425. The cylindrical portion 428 of the valve 427 is not a close fit for the bore 415, and cabin pressure, which has access to the space surrounding the stem portion of the valve member 427 as later described, enters the left-hand chamber 416 in Fig. 37 and flows, when the valve 427 is seated, through the annular groove 421, the passage 422, the bore 423 of the conduit 424, and the conduit 18, into the bellows 361. When the valve 427 is moved to the left and opens communication between the left-hand passage 417 and the left-hand chamber 416, pressure may be transmitted from the conduit 424 through the passage 422, radial passage 420, left-hand chamber 416, left-hand passage 417, space 418, conduit 426 and conduit 21 to the exterior of the plane. A valve member 431 is reciprocable, with a slight clearance such as exists around the valve 427, in the right-hand passage 415 and is adapted to have its inner end 432 enter and cooperate with the right-hand passage 417. This valve is, however, hollow, as shown at 433, and has a relatively small passage 434 opening centrally through its tapered end, with the result that the interior of the valve is adapted to be continuously subjected to external pressure, that is, the pressure outside the cabin, through the right-hand passage 417, the chamber 418, conduit 426 and conduit 21.

*The control of rate of tank pressure change*

The chamber 406 formed in the plug 407 is adapted to have a highly restricted communication with the interior of the cabin, and further to have continuous communication with each of two mechanisms which will shortly be described, and both of which function to limit the rate of cabin pressure change. Upon the inner end of the plug 407 there is threadedly mounted a cap 437, which holds in position an annular plate 438 against the end of the plug 407. This annular plate 438 is traversed by a small port 439, and an annular scratch 440, which is coaxial with the plug 407, is formed in the right-hand face of the plate 438 in communication with the port 439. A radial groove 441 extends outwardly from a conical enlargement 442 of the chamber 406 and intercepts the scratch 440. The radial groove 441 and the restricted port 439 are shown as far apart from each other as possible, and accordingly the rate of flow between the chamber 406 and the space outside the plate 438 will be at a minimum. The inner end of the plug 407 and its supported parts are disposed within a cap member 444 secured in position between the head 401 and a shoulder 445 on the casing 400. The space within the cap member 444 is separated from an annular chamber 447 within the head 401 by a filter and screen arrangement constituted, in view of the extreme fineness of the scratch 440, of a fine mesh screen and of filter paper, this composite dirt excluding device being designated 448. The chamber 447 is in continuous communication with the interior of the airplane cabin as will later be explained. Accordingly, there is at all times a very restricted communication between the interior of the tank 23 and the interior of the cabin, tank pressure lagging behind cabin pressure when cabin pressure is increasing and falling more slowly than cabin pressure when cabin pressure is diminished.

*The control of the valve 427*

For the control of the valve 427 there are provided a plurality of devices. This valve is controllable automatically to maintain approximately constant cabin pressure between predetermined levels, such as 8,000 and 35,000 feet, regardless of the height of the plane between those limits. The valve is further controlled automatically by means which precludes the diminution of cabin pressure between the moment of take-off and the attainment of cabin pressure conditions which are to be maintained during normal flight (those to be maintained during the range of, say, from 8,000 to 35,000 feet) at a rate in excess of a predetermined maximum, in order that the occupants of the cabin may be saved discomfort. There is further provided for the control of the valve 427 additional means whereby the first mentioned control means may be adjusted at will to effect a predetermined rise in cabin pressure above that normally maintained in the flight zone of 8,000 to 35,000 feet. The operation of this last mentioned mechanism is supplemented by mechanism later to be described which limits the rate of change of cabin pressure which would be effectuated by the operation of this adjustable means.

Referring to Figs. 35 and 42, it will be observed that the casing 400 has, at a point between its left-hand end in Fig. 35 and the supporting ribs or webs 411, an inwardly projecting portion, herein shown as an annular portion 451, which serves as a mounting means. Clamped to the annular portion 451 is an annular end member 452, and to the left-hand face of the end member 452 there is clamped a perforated cylindrical housing member 453. Surrounding this housing member and also held in position by means of the annular flange 451 is a cylindrical screen structure 454 whose right-hand end together with the right-hand end of the housing member 453 and the end member 452 is held in position by suitable screw devices 455 threadedly engaged, as at 456, in the annular rib 451. The housing member 453 at its rearward end supports a transverse plate 457 and is longitudinally slotted at several points about its periphery for a substantial distance as shown at 458 at its end which supports the plate 457. The plate 457 serves as a mounting for a stop rod 459 which has an enlarged head portion 460 spaced a short distance from its rear end. To this head portion there is brazed or otherwise suitably secured the rear end of a bellows 461 whose forward end is connected to a head member 462 which has a central projection 463 having a bore 464 in which the front end of the stop rod 459 is received. The space within the bellows is evacuated. Ordinarily, in view of the evacuated state of the bellows 461, the head 462 engages the stop rod 459, that is to say, unless the cabin pressure is below a predetermined value which corresponds to any desired elevation, as, for example, 8,000 feet mentioned above. The head 462 is slidably guided in a cylindrical bore 465 formed in the head 452 and has a peripheral flange 466 which is engaged by one end of a spring 467 whose other end rests upon a shoulder 468 formed near the rear end of a sleeve 469 which is slidable within the cylindrical member 453. Pins 471 are carried by the rear end of the sleeve 469 and project through the longitudinal slots 458 in the member 453 and are received at their outer ends in a helical groove 472 formed in a rotatable adjusting member 473 which is secured to a gear member 474, which is in turn rotatably mounted upon a sleeve 475 surrounding the rearward end of the stop rod 459. By rotating the gear 474 the internally threaded sleeve 473 will be turned on its axis and will cause the pins 471 to move in one direction or the other along the slots 458, thus changing the compression of the spring 467 and altering the point at which reducing cabin pressure will no longer hold the evacuated bellows 461 compressed. Also supported on the sleeve 475 is another and larger gear 476 to which there is secured a pointer 477. A cap member 478 mounted on the left-hand end of the casing 400, as the same is shown in Fig. 35, supports an annular cover-glass 479. The cap member 478 supports an annular dial 480 intermediate the cover-glass 479 and the large gear 476, this dial being located inwardly of the pointer 477. The inner rim of the cover-glass 479 is supported by a further cover ring 482 which is clamped against a flange 483 on the sleeve 475 by means of a nut and washer arrangement 484 secured on the threaded extremity 485 of the stop rod 459. In order that the pointer 477 may be turned at the same time that the compression of the spring 467 is adjusted, I have mounted a pair of pinions 487 and 488 for concurrent turning. The pinion 487 is mounted on a shaft 489. The pinion 488 is formed on a sleeve-like body 490 surrounding the shaft 489. The shaft 489 and the sleeve 490 are secured together as at 492 after the requisite adjustment between the pinions has been made to cause the pointer to mark the desired zero position, herein thirty inches, at the proper degree of compression of the spring 467. It will be noted that by turning the pinions concurrently at equi-angular rates, the pointer will be moved and the sleeve 469 will be adjusted; and the adjustment of the sleeve will change the compression of the spring 467 so that the pointer will indicate the pressure in inches of mercury (with the calibration employed) within the cabin at which the spring 467 will be effective to move the head 462 in a direction to effect closure of the valve 427. It may be noted by an inspection of Fig. 34 that the dial 480 is calibrated in inches of mercury absolute. The reading "30" corresponds to approximately atmospheric pressure at sea level, and it also corresponds to a barometric pressure of 18 inches of mercury in a 360° different pointer position. When the pinions are turned until the pointer 477 is at a position of "22¼" approximately, there will exist such an adjustment of the spring compression that the head 462 will not be moved toward the right in Fig. 35 until the cabin pressure is reduced to a value corresponding to an elevation of 8,000 feet. Referring to Fig. 35, it will be apparent that the compression of the spring 467 is at a minimum, and with the arrangement shown this would correspond to a setting at eighteen inches of mercury (the same position of Fig. 34) and a height of between 13,000 and 14,000 feet. Thus during normal flight at above 8,000 feet the spring will be more compressed than Fig. 35 shows it, and when it is desired to increase cabin pressure the spring 467 will have its compression still further increased.

Before describing the mechanism which operates to control the rate at which the cabin pressure can be reduced during the period immediately following takeoff, it may be noted that the interior of the casing 400 is connected with cabin pressure through an opening 494, Fig. 36; that all of the fluid which is to pass to the right of the end member 452 must pass through the screen 454; that openings 496 are provided in the end member for the establishment of cabin pressure conditions within a chamber 497 between the annular rib 451 and the radial ribs 411; and that in the movable end member 462 there are provided additional openings 498 for the transmission of cabin pressure conditions into a space centrally of the chamber 497.

The stationary head member 452 has secured thereto a pair of coaxially arranged bellows 500, 501, these being suitably brazed or otherwise attached to the head 452. At their other ends they are attached to a movable head member 502, and the space bounded by these bellows and the portions of the head members between their attachments to these members is designated 503. The head member 502 inwardly of the bellows 501 is perforated, as at 504, to permit equalization of pressures at opposite ends of the inner bellows so far as the areas thereof responsive to pressure are concerned. The head 502 is provided with a sleevelike portion 506 to which the valve 427 is connected by a wire connector 507. An adjustable abutment device 508 is supported by the sleeve portion 506 and has a rear extremity 509 which is adapted to coact with the movable end member 462 when the evacuated bellows 461 takes over control. When the evacuated bellows is still in its collapsed position, the extremity 509 controls the distance the valve 427 may be moved to the left. The space 503 between the bellows 500 and 501 is connected through a conduit 510 and a passage 511 in the plug element 407 with the chamber 406, so that the pressure conditions within the tank 23 always subsist in the space between the two bellows mentioned. A spring 512 of suitable strength and length is provided to act upon the left-hand face of the movable head 502 in Fig. 35, the other end of this spring resting upon an annular shoulder 514 on the body 412.

Let us now reexamine the conditions relative to the bellows 500 and 501. The space 503 between these bellows is continuously under the pressure prevailing within the tank 23. The space inside the bellows 501 is under cabin pressure but the oppositely acting areas counterbalance each other. The outside of the bellows 500 and the outside of the head 502 are subject to cabin pressure, and cabin pressure acts on these surfaces to provide a force tending to open the valve 427. The spring 512 exerts a predetermined pressure tending to open the valve 427. When cabin pressure is less than tank pressure, the pressure from the tank within the chamber 503 between the bellows 500 and 501 will tend to close the valve 427. The areas, and the strength of the spring 512, are so predetermined that whenever tank pressure exceeds cabin pressure by a predetermined amount the valve 427 will close. These relative areas and pressures are so predetermined as to limit the rate of decrease in cabin pressure while climbing to the pressurizing altitude (about 8,000) to about one inch of mercury per minute (equivalent to 1,000 feet per minute at sea level).

It will now be possible to follow the operation of the pilot mechanism so far described. Let us start with a plane about to take off. Air is being continuously pumped into its cabin. The pressure within the tank 23 and within the cabin may be presumed to be equal. The valve 427 will be open. As the plane rises from the ground the cabin vent valve 350 will be open and cabin pressure will commence to fall. As soon as cabin pressure has fallen a predetermined amount relative to tank pressure the bellows device 500, 501 will close the valve 427, resulting in cabin pressure passing along the valve 427 entering the vent valve operating bellows 361 and partially closing the vent valve. This will result in an interruption in the fall of cabin pressure or in an actual slight increase, and as a result as soon as the tank pressure falls to less than the predetermined amount as above determined below cabin pressure, the valve 427 will again open and there will be, as a result, a further opening of the vent valve from the cabin. This process, instead of occurring in steps, will occur more or less as a continuous operation, and the cabin pressure will drop off steadily at a controlled rate not exceeding one inch of mercury per minute.

When the so-called pressurizing height (8,000 feet) is attained, the spring 467 will move the head 462 to the right, and thereafter control of the cabin pressure will be under the government of the evacuated bellows 461 until the plane: (a) exceeds 35,000 feet, (b) passes below 8,000 feet, or (c) there is an adjustment of the tension of the spring 467. Of course if the spring 467 is placed under a higher compression than that designed for 8,000 foot operation of the bellows 431, the end member 462 will be moved to the right and held in that position continuously until cabin pressure builds up to a value corresponding to the new setting of the spring 467. This would mean that the valve 427 would be closed continuously for a substantial period, with the result that the cabin vent valve would be closed continuously, and there would be a very rapid and uncomfortable rise of cabin pressure. Nothing in the mechanism associated with the valve 427 would prevent this result, but I have provided in the mechanism which I shall now describe additional means for preventing an excessively rapid rise in cabin pressure.

*The control of the valve 431*

The control mechanism enclosed within the housing 400 in the space to the right of the ribs 411 is adapted to operate the valve 431 to cause the performance of two functions: (a) when the plane attains to altitudes in excess of say 35,000 feet, this controlling mechanism is adapted so to govern the operation of the valve 431 that the valve 350 will cause a constant ratio to be maintained between the cabin pressure and the external pressure; and (b) when the spring 467 has had its compression adjusted to raise the cabin pressure, a portion of the control mechanism, which I shall shortly describe, will operate to limit the rate of increase in cabin pressure to a suitable one, for example holding the rate of pressure change to 0.30" of mercury a minute. These controlling devices operate to perform the functions needed through their control of the valve 431 and the resultant control of cabin vent valve 350.

The space to the right in Fig. 35 of the ribs 411 may be considered as divided into two compartments 517 and 518, these compartments being partially separated from each other by an annular flange 519, but communicating freely with each other through a series of openings 520, and both compartments being under cabin pressure. The flange or internal rib 519 provides a circular, inwardly facing guide surface 522 within which there is slidably mounted a casing element 523. This casing element is closed at one end by a platelike portion 524 and also threadedly receives a cooperating housing member 525, which has a reduced annular portion 526 at its left-hand end in Fig. 35 within which there is threadedly secured a member 527, which provides a radially inwardly projecting flange 528, a radially outwardly projecting flange 529 and a cylindrical axially extending, perforated stop sleeve portion 530. Bellows 532 and 533 are connected at their left-hand ends in Fig. 35 respectively to the outer flange 529 and the inner flange 528, and at their right-hand ends they are connected to an annular head member 535 to which there is attached a plate 536 having a hollow sleeve 537 secured thereto and extending to the left in Fig. 35 beyond the left-hand end of the bellows 533 and supporting the valve 431. As has previously been explained, the valve 431 is hollow, and, accordingly, the space inside the casing 525, except that portion of the interior of the casing which is inside the bellows 533 and the space between the bellows 532 and 533, is subjected constantly to external pressure through the hollow valve 431. The space to the inside of the bellows 533 is subjected to cabin pressure through openings 539 in a flange 540 formed on the plug member 414'. The space enclosed between the bellows 532 and 533 is evacuated. It will be evident that the device so far described will not be effective to unseat the valve 431 from its position of engagement with the wall of the right-hand passage 417 until external pressure has fallen to a low value, a value such as might exist at 35,000 feet. After the plane attains, therefore, to such an elevation as 35,000 feet and so long as it remains above it, the position of the valve 431 will shift as the plane moves higher or lower in such a manner as to maintain a constant ratio between cabin pressure and external pressure. Cabin pressure will act on a relatively small area and external pressure on a relatively large area, and the cabin pressure will, therefore, be maintained in the same proportion to the external pressure as the ratio of the area subject to external pressure bears to the area subject to cabin pressure.

The plate 524 has attached thereto a bellows 542 whose other end is attached to a flange 543 on the member 444 previously described. Between a shoulder on the member 444 and the end plate 524 a spring 545 constantly acts. The characteristics of this spring will shortly be explained. The space inside of the bellows 542 is constantly connected through a passageway 541 to the chamber 406 which is in communication with the tank 23. Now it will be observed that an area upon the head 524 and subject to tank pressure is opposed by an equal and oppositely facing area subject to cabin pressure. When cabin pressure and tank pressure are the same, the spring 545 will maintain the casing 523, 525 in a limiting position to the left which will be determined by the engagement of the valve 431 with its seat. A shoulder 549 on the member 527 and an oppositely facing surface on the guide flange 540 will be spaced by a small distance at this time. If cabin pressure is less than tank pressure, the position of the composite housing 523, 525 will not be changed. If, however, cabin pressure is higher than tank pressure by an amount sufficient to enable the overcoming of the spring 545, the entire mechanism disposed within the casing 523, 525 and such casing will be moved bodily to the right in Fig. 35, and the valve 431 will be opened and the operating bellows 361 will be vented to the outside air, and the valve 350 will be moved in an opening direction. As soon as this partial opening movement takes place there will be a decrease in cabin pressure which will enable the spring 545 again to close the valve 431, with a resultant partial reopening of the cabin vent valve. It will be clear that instead of this operation taking place in a series of pronounced steps, what will occur will be a modification of the adjustment of the cabin vent valve movements so that cabin pressure cannot rise at a rate in excess of the predetermined amount determined by the strength of the spring 545 and desirably about 0.30" of mercury a minute, notwithstanding the adjustment that may have been made by means of the deliberate adjustment of the compression of spring 467.

When cabin and tank pressures are approximately the same, it will be obvious that the only thing that will cause movement of the valve 431 will be pressure variations within the chamber with which the follow interior of the valve 431 communicates. Until a predetermined substantially great altitude, perhaps 35,000 feet, is attained, the external pressure acting upon the bellows 532 and 533 will be sufficient to maintain these bellows, in their evacuated condition, in such a position that the head 535 will engage the stop 530 and maintain the valve 431 closed. When, however, the elevation exceeds 35,000 feet, the external pressure will fall sufficiently to allow expansion of the bellows 532, 533 and an opening of the valve 431 with a resultant partial closure of the vent valve 350, and because of the relative areas, which have been previously explained, above the height of 35,000 feet, there will be maintained a predetermined ratio between cabin pressure and external pressure.

General operation

In view of the description of the mode of operation of the components of the illustrative embodiment of the invention which has been given, as description of the parts themselves has been set down, an extensive description of the operation of the apparatus as a whole is unnecessary. It will be understood that when cabin pressure exceeds external pressure and the interior of the bellows 361 is connected with the outside of the cabin, the cabin vent valve 350 will tend to stand open. Now, let us suppose the plane takes off and rises at a rapid rate. From the time it leaves the ground until the time it reaches an elevation of, say, 8,000 feet, if that be the selected height at which the bellows 461 is to function, the cabin pressure will be reduced not at the rate at which the external pressure is reduced, but at a rate controlled by the operation of the bellows 500, 501 and the spring 512; there being maintained through the control of the position of the valve 427 a limitation on the rate of cabin pressure reduction to about one inch of mercury per minute or, in other terms, to the equivalent to 1000 feet per minute rise starting at sea level. As the bellows 461 will not expand and take control of the valve 427 until the pressure inside the cabin falls to a value equivalent to external pressure at 8,000 feet, this bellows will be delayed in coming into operation more than would be the case if the cabin pressure could fall freely, but it will assume control as soon as the cabin pressure gets low enough. Normally between the heights of 8,000 feet and 35,000 feet the cabin interior will be maintained at approximately a uniform pressure equivalent to external pressure at 8,000 feet, after the pressure has dropped off to that value. If flying at elevations above 35,000 feet occurs, the diaphragm device 532, 533 will come into operation and permit the escape of air from the valve operating bellows 361, and a resultant partial further opening of the vent valve so that the cabin pressure will be diminished at levels above 35,000 feet, and by reason of the mode of operation heretofore described, the cabin pressure will be maintained at a predetermined ratio (exceeding unity) to external pressure. When the plane descends below 35,000 feet the automatic control device 461 will again assume control of cabin pressure and will maintain a cabin pressure approximately equivalent to that which prevails outside the cabin at an elevation of 8,000 feet. When the plane approaches a landing field, the pilot, or the stewardess, may, if desired, change the adjustment of the spring 467 to effect an increase in the cabin pressure to a value materially above that corresponding to 8,000 feet, but the rate of cabin pressure rise will then be controlled and limited by the bellows 542 and the spring 545 which will limit the rise in cabin pressure to approximately three-tenths of an inch of mercury per minute. As the total range of possible adjustment is only 12" of mercury, it will be evident that a delay of not exceeding forty minutes in the building up of cabin pressure will at maximum be possible.

While there is in this application specifically described one form which the invention may assume in practice it will be understood that this form of the same is shown for purposes of illustration and that the invention may be modified and embodied in various other forms without departing from its spirit or the scope of the appended claims.

What I claim as new and desire to secure by Letters Patent is:

1. In a system for maintaining pressures in an aircraft cabin with the necessary replacement of air, the combination with means for permitting the escape of excess quantities of air from the cabin, first freely until the pressure is reduced to the pressure at a predetermined height, then in such a manner as to maintain the cabin pressure constant until a considerably greater height is reached, and finally in a manner to allow cabin pressure to be reduced as the height is further increased while yet maintaining cabin pressure higher than ambient pressure, of means including an altitude responsive control means and an air pump having means governed by said control means for altering the ratio of its intake pressure to its terminal pressure for supplying air to the cabin operative first to supply air, until a predetermined height is reached, by displacement, and above such height after a predetermined reduction in volume thereof.

2. In a system for maintaining conditions in the cabin of an aircraft suitable for occupancy at widely varying heights, the combination with pressure responsive valve means for permitting the escape of excess quantities of air from the cabin while maintaining the desired pressure conditions, of means for supplying continuously to the cabin air from the exterior of the latter, said last mentioned means including a supercharger connected in driven relation with an engine of the aircraft, unloading means for said supercharger including a valve for releasing fluid from said supercharger and having a connection for delivering the air so released to the cabin, and altitude responsive means for automatically rendering said unloading means ineffective when a predetermined height is reached.

3. In a pressurizing system for maintaining pressures in an aircraft cabin with necessary replacement of air continuously effected, the combination with means for permitting the escape of excess quantities of air while maintaining certain minimum pressures, of means for supplying air to the cabin including a compressor having associated therewith valve means operative respectively in open and closed positions thereof to cause said compressor to deliver air to the cabin by displacement and to cause said compressor to compress air to effect a predetermined reduction in volume thereof and to deliver the air so compressed to the cabin, and means including altitude responsive control means for said valve means for effecting operation of said valve means to cause said compressor to change its mode of operation from the first to the second thereof and vice versa.

4. In a system for maintaining pressures in an aircraft cabin, with necessary replacement of air continuously effected, the combination with means for permitting the escape from the cabin of excess quantities of air while maintaining certain minimum pressures, of means for supplying air to the cabin including a supercharger having an inlet connected with the exterior of the cabin, and discharges spaced from each other and from said inlet and having connections leading to the interior of the cabin and relatively movable elements cooperating to form compression spaces each registering at different times with said inlet and with said discharges individually, in turn, means for controlling the connection leading from the discharge first registered with by each of said compression spaces, and ambient pressure responsive means for controlling said controlling means to effect cutting off of the discharge controlled thereby, thereby to confine discharge to the cabin by said supercharger to the other of said discharges.

5. In a system for maintaining pressures in an aircraft cabin, with necessary replacement of air continuously effected, the combination with means for permitting the escape of excess quantities of air while maintaining certain minimum pressures, of means for supplying air to the cabin including a supercharger having an inlet and a pair of mutually spaced discharges each spaced from said inlet and both arranged to deliver air to the cabin, said supercharger comprising relatively movable elements cooperating to form compression spaces diminishing in volume upon operation of said supercharger, and each communicating successively and separately with said inlet and with each of said discharges, one of said discharges arranged to communicate with said compression spaces before diminishing of the volumes thereof commences and the other only after a predetermined diminution of the volumes of said compression spaces, and valve means for controlling the flow of air from said one of said discharges to said cabin.

6. In a system for maintaining pressures in an aircraft cabin, with necessary replacement of air continuously effected, the combination with means for permitting the escape from the cabin of excess quantities of air while maintaining certain minimum pressures, of means including an altitude responsive control means and an air pump having means governed by said control means for altering the ratio of its intake pressure to its terminal pressure for supplying air to the cabin, during flight below a predetermined height, by displacement, and, during flight at and above such height, after a predetermined reduction in volume of the air.

WIN W. PAGET.

REFERENCES CITED

The following references are of record in the file of this patent:

UNITED STATES PATENTS

| Number | Name | Date |
|---|---|---|
| 1,461,700 | Nichols | July 10, 1923 |
| 1,562,663 | Strong | Nov. 24, 1925 |
| 1,779,160 | Diehl | Oct. 21, 1930 |
| 2,063,477 | Young et al. | Dec. 8, 1934 |
| 2,081,762 | Nissen | May 25, 1937 |
| 2,119,402 | Puffer | May 31, 1938 |
| 2,164,545 | Rogers | July 4, 1939 |
| 2,208,554 | Price | July 16, 1940 |
| 2,278,112 | Matys | Mar. 31, 1942 |
| 2,284,984 | Nixon et al. | June 2, 1942 |
| 2,316,237 | Grunert et al. | Apr. 13, 1943 |
| 2,316,416 | Gregg | Apr. 13, 1943 |
| 2,327,737 | Pendergast | Aug. 24, 1943 |
| 2,330,322 | Williams | Sept. 28, 1943 |
| 2,358,815 | Lysholm | Sept. 26, 1944 |
| 2,358,835 | Streid | Sept. 26, 1944 |
| 2,391,486 | Smith | Dec. 25, 1945 |

FOREIGN PATENTS

| Number | Country | Date |
|---|---|---|
| 509,637 | France | Aug. 21, 1920 |